US012721774B2

(12) United States Patent
Aoki et al.

(10) Patent No.: US 12,721,774 B2
(45) Date of Patent: Sep. 1, 2026

(54) GAIT MOTION ASSISTING APPARATUS

(71) Applicant: Suncall Corporation, Kyoto (JP)

(72) Inventors: Shin Aoki, Kyoto (JP); Yukinobu Makihara, Tokyo (JP)

(73) Assignee: Suncall Corporation, Kyoto (JP)

( * ) Notice: Subject to any disclaimer, the term of this patent is extended or adjusted under 35 U.S.C. 154(b) by 1410 days.

(21) Appl. No.: 17/422,898

(22) PCT Filed: Dec. 11, 2019

(86) PCT No.: PCT/JP2019/048381
§ 371 (c)(1),
(2) Date: Jul. 14, 2021

(87) PCT Pub. No.: WO2020/153025
PCT Pub. Date: Jul. 30, 2020

(65) Prior Publication Data

US 2022/0110816 A1 Apr. 14, 2022

(30) Foreign Application Priority Data

Jan. 23, 2019 (JP) ................................ 2019-009158

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0266* (2013.01);
(Continued)

(58) Field of Classification Search
CPC ........ A61H 3/00; A61H 1/024; A61H 1/0266; A61H 2201/1207; A61H 2201/164;
(Continued)

(56) References Cited

U.S. PATENT DOCUMENTS

2007/0054777 A1 * 3/2007 Kawai .................... B25J 9/1638 482/1
2015/0025423 A1 * 1/2015 Caires ..................... A61H 3/00 601/35

(Continued)

FOREIGN PATENT DOCUMENTS

JP 6148766 B1 6/2017
JP 2017213246 A 12/2017

(Continued)

OTHER PUBLICATIONS

JP2017213346_machine_translation_accessed_3_12_25 (Year: 2025).*

(Continued)

*Primary Examiner* — Brandy S Lee
*Assistant Examiner* — Kris Hanyu Gong
(74) *Attorney, Agent, or Firm* — Sterne, Kessler, Goldstein & Fox P.L.L.C.

(57) ABSTRACT

A gait motion assisting apparatus of the present invention includes a casing attachable to right and left knee ankle foot orthoses, an electric motor, a drive arm having a proximal end driven around a drive-side pivot axis by driving force from the electric motor and a distal end operatively connected to a lower leg frame of the orthosis, a rotation sensor detecting a swinging position of the drive arm around the drive-side pivot axis, a gait motion state detection sensor and a control device. The control device recognizes as a reference value a detection signal from the rotation sensor when the lower leg is fully extended, and judges right or left of leg to which the orthosis is mounted based on a detection signal other than the reference value to select right or left of assisting force control data used when calculating assisting force to be output from the electric motor.

12 Claims, 23 Drawing Sheets

(52) U.S. Cl.
CPC ................ *A61H 2201/1207* (2013.01); *A61H 2201/164* (2013.01); *A61H 2201/1676* (2013.01); *A61H 2201/5058* (2013.01)

(58) Field of Classification Search
CPC .... A61H 2201/1676; A61H 2201/5058; A61H 2201/5064; A61H 2201/1642; A61H 2201/165; A61H 2201/5069; A61H 2201/5079; A61H 2201/5084; A61F 2005/0155; A61F 2005/0158; A61F 5/0125
See application file for complete search history.

(56) References Cited

U.S. PATENT DOCUMENTS

| | | | | |
|---|---|---|---|---|
| 2015/0190923 | A1* | 7/2015 | Seo | A61H 1/0244 602/16 |
| 2016/0331560 | A1* | 11/2016 | Tong | A61H 1/024 |
| 2018/0272525 | A1* | 9/2018 | Kumeno | B25J 9/1638 |
| 2020/0315899 | A1 | 10/2020 | Takahashi et al. | |

FOREIGN PATENT DOCUMENTS

| | | | | |
|---|---|---|---|---|
| JP | 2017213346 | * | 12/2017 | A61H 3/00 |
| WO | WO-03099525 A2 | * | 12/2003 | A61H 1/0262 |
| WO | WO-2014190459 A1 | * | 12/2014 | A61B 90/06 |
| WO | WO-2018023109 A1 | * | 2/2018 | A61F 2/70 |

OTHER PUBLICATIONS

WO2014190459_machine_translation_accessed_3_14_25 (Year: 2025).*
International Search Report issued in International Application No. PCT/JP2019/048381, mailed Mar. 3, 2020, 4 pages.

* cited by examiner

GAIT MOTION ASSISTING APPARATUS

FIELD OF THE INVENTION

The present invention relates to a gait motion assisting apparatus imparting gait assisting force to a user that wears a knee-ankle-foot orthosis.

BACKGROUND ART

Gait motion assisting apparatuses are previously proposed that can be attached to knee ankle foot orthoses utilized as gait assistance or rehabilitation devices for people with leg disability or people with paralysis due to a stroke or the like (see Patent Literature 1 below).

Specifically, the knee ankle foot orthosis includes a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with the user's knee joint, and a swinging position of the lower-leg frame around the brace-side pivot axis when the lower leg is fully extended is defined as a forward swinging end of the lower-leg frame around the brace-side pivot axis relative to the thigh frame.

The gait motion assisting apparatus includes a casing, an electric motor accommodated in the casing, a drive arm driven around a drive-side pivot axis by the electric motor, a thigh orientation detecting means for detecting a hip joint angle, which is the front-back swinging angle of the user's thigh, and a control device responsible for operational control for the electric motor.

The casing can be attached to the thigh frame no matter whether the knee ankle foot orthosis is attached to either the left leg or the right leg of the user.

That is, the casing is configured so as to have a first orientation that is a connectable orientation wherein the inner surface faces the knee ankle foot orthosis and the drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg.

Assisting force control data that is used when calculating the direction and the size of assisting force to be imparted to the lower-leg frame and that includes left-leg assisting force control data and right-leg assisting force control data respectively used when the knee ankle foot orthosis is attached to the left leg and right leg of the user is stored in the control device in advance, and the control device is configured so as to calculate a gait motion timing during a gait cycle based on a detection signal that is input from the thigh orientation detecting means, apply the calculated gait motion timing to one of the left-leg assisting force control data and the right-leg assisting force control data to calculate the direction and the size of assisting force to be imparted to the lower-leg frame, and perform operational control for the electric motor such that assisting force having the calculated direction and size can be obtained.

Meanwhile, the above conventional gait motion assisting apparatus is provided with a selector switch for selecting a left leg or a right leg, and the control device is configured to use the assisting force control data, among the left-leg assisting force control data and the right-leg assisting force control data, in accordance with the left leg or the right leg selected through the selector switch.

In this case, when the user erroneously operates the selector switch, i.e., when the right leg is selected through the selector switch even when the gait motion assisting apparatus is attached to the left leg (or when the left leg is selected through the selector switch even when the gait motion assisting apparatus is attached to the right leg), there is a possibility that assisting force having an appropriate direction and size is not imparted to the lower-leg frame.

PRIOR ART DOCUMENT

Patent Literature

Patent Literature 1: JP 6148766

SUMMARY OF THE INVENTION

The present invention has been conceived in view of such conventional art, and an object of the present invention is to provide a gait motion assisting apparatus including a casing attachable to and detachable from a knee ankle foot orthosis, an electric motor accommodated in the casing, a drive arm to be operatively driven by the electric motor, a gait motion state detection sensor for detecting a gait motion state, and a control device that has left-leg assisting force control data and right-leg assisting force control data respectively used when the knee ankle foot orthosis is attached to a left leg and a right leg of a user and that performs operational control for the electric motor based on a detection result of the gait motion state detection sensor and one of the left-leg assisting force control data and the right-leg assisting force control data, wherein the gait motion assisting apparatus is capable of effectively preventing a mismatch between the left or right leg of the user actually wearing the knee ankle foot orthosis and the left or right-leg assisting force control data used by the control device for performing operational control for the electric motor.

In order to achieve the object, a first aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including: a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a rotation sensor capable of detecting a swinging position of the drive arm around the drive-side pivot axis; a gait motion state detection sensor for detecting a gait motion state during a gait cycle; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a gait motion timing during a gait cycle based on a detection signal that is input from the gait motion state detection sensor at a sampling timing, applying the calculated gait motion timing to one of the left-leg assisting force control data and the right-leg assisting force control data to calculate the direction and the size of assisting force to be imparted to the lower-leg frame, and performing operational control for the electric motor (130) such that assisting force having the calculated direction and size can be obtained, wherein the control device recognizes as a reference value a detection signal that is input from the rotation sensor when the lower leg is fully extended, and selects the assisting force control data to be used among the left-leg assisting force control data and the right-leg assisting force control data based on a detection signal that is input from the rotation sensor and that is different from the reference value.

The gait motion assisting apparatus according to the first aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In order to achieve the object, a second aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including: a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a rotation sensor capable of detecting a swinging position of the drive arm around the drive-side pivot axis; a gait motion state detection sensor for detecting a gait motion state during a gait cycle; a notification means for notifying the user of presence of an error; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a gait motion timing during a gait cycle based on a detection signal that is input from the gait motion state detection sensor at a sampling timing, applying the calculated gait motion timing to the assisting force control data selected by manual operation among the left-leg assisting force control data and the right-leg assisting force control data to calculate the direction and the size of assisting force to be imparted to the lower-leg frame, and performing operational control for the electric motor such that assisting force having the calculated direction and size can be obtained, wherein the control device is configured so as to recognize as a reference value a detection signal that is input from the rotation sensor when the lower leg is fully extended, determine the assisting force control data to be used among the left-leg assisting force control data and the right-leg assisting force control data based on a detection signal that is input from the rotation sensor and that is different from the reference value, and, when the assisting force control data to be used is different from the assisting force control data selected by manual operation, notify the user of an error via the notification means.

The gait motion assisting apparatus according to the second aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In a preferable configuration of the second aspect, when the assisting force control data determined to be used based on a signal from the rotation sensor is different from the assisting force control data selected by manual operation, the control device is configured to suspend operation of the electric motor in addition to notifying of an error by the notification means.

Alternatively, in the second aspect, when the assisting force control data determined to be used based on a signal from the rotation sensor is different from the assisting force control data selected by manual operation, the control device may be configured to, in addition to notifying of an error by the notification means, employ the assisting force control data determined to be used based on a signal from the rotation sensor in place of the assisting force control data selected by manual operation, apply the calculated gait motion timing to the assisting force control data to calculate a direction and a size of assisting force to be imparted to the lower-leg frame, and perform operational control for the electric motor such that assisting force having the calculated direction and size can be obtained.

In any one of the various configurations of the first and second aspects, the control device is preferably configured to select the assisting force control data to be used among the left-leg assisting force control data and the right-leg assisting force control data based on a first detection signal, other than the reference value, input from the rotation sensor after a main power source of the gait motion assisting apparatus is switched ON from OFF.

In one example, the rotation sensor is an absolute rotary encoder wherein the reference value is set as a zero-point position.

In another example, the rotation sensor is an incremental rotary encoder.

For example, the gait motion assisting apparatus is provided with a manually operable reference switch, wherein the control device is configured to recognize as the reference value a detection signal that is input from the rotation sensor when the reference switch is ON.

In another example, it is possible that the control device calculates angular acceleration of the drive arm around the drive-side pivot axis based on a detection signal that is input from the rotation sensor, recognizes a time when the angular acceleration exceeds a predetermined threshold value as a fully extended position of the lower-leg frame, and recognizes as the reference value a detection signal of the rotation sensor that is input at that time.

In still another example, it is also possible that the gait motion assisting apparatus is provided with a fully extended position detection sensor for directly or indirectly detecting that the lower-leg frame is in a fully extended position.

In this example, the control device recognizes as the reference value a detection signal that is input from the rotation sensor when the fully extended position detection sensor detects an arrival of the lower-leg frame in the fully extended position.

In order to achieve the object, a third aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including; a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a rotational direction detecting mechanism for detecting in which direction among the first and second directions around the drive-side pivot axis the drive arm is rotated from a reference position, with the swinging position around the drive-side pivot axis where the drive arm arrives when the lower leg is fully extended being regarded as the reference position; a gait motion state detection sensor for detecting a gait motion state during a gait cycle; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a gait motion timing during a gait cycle based on a detection signal that is input from the gait motion state detection sensor at a sampling timing, applying the calculated gait motion timing to the assisting force control data selected by manual operation among the left-leg assisting force control data and the right-leg assisting force control data to calculate the direction and the size of assisting force to be imparted to the lower-leg frame, and performing operational control for the electric motor such that assisting force having the calculated direction and size can be obtained, wherein the control device selects the assisting force control data to be used among the left-leg assisting force control data and the right-leg assisting force control data based on a detection result of the rotational direction detecting mechanism.

The gait motion assisting apparatus according to the third aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In order to achieve the object, a fourth aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a rotational direction detecting mechanism for detecting in which direction among the first and second directions around the drive-side pivot axis the drive arm is rotated from a reference position, with the swinging position around the drive-side pivot axis where the drive arm arrives when the lower leg is fully extended being regarded as the reference position, a gait motion state detection sensor for detecting a gait motion state during a gait cycle; a notification means for notifying the user of presence of an error; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a gait motion timing during a gait cycle based on a detection signal that is input from the gait motion state detection sensor at a sampling timing, applying the calculated gait motion timing to the assisting force control data selected by manual operation among the left-leg assisting force control data and the right-leg assisting force control data to calculate the direction and the size of assisting force to be imparted to the lower-leg frame, and performing operational control for the electric motor such that assisting force having the calculated direction and size can be obtained, wherein the control device is configured so as to determine the assisting force control data to be used among the left-leg assisting force control data and the right-leg assisting force control data based on a detection result of the rotational direction detecting mechanism, and, when the assisting force control data to be used is different from the assisting force control data selected by manual operation, notify the user of an error via the notification means.

The gait motion assisting apparatus according to the fourth aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In a preferable configuration of the fourth aspect, when the assisting force control data determined to be used based on a detection result of the rotational direction detecting mechanism is different from the assisting force control data selected by manual operation, the control device suspends operation of the electric motor in addition to notifying of an error by the notification means.

Alternatively, in the fourth aspect, when the assisting force control data determined to be used based on a detection result of the rotational direction detecting mechanism is different from the assisting force control data selected by manual operation, the control device, in addition to notifying of an error by the notification means, employs the assisting force control data determined to be used based on the detection result of the rotational direction detecting mechanism in place of the assisting force control data selected by manual operation, applies the calculated gait motion timing to the assisting force control data to calculate a direction and a size of assisting force to be imparted to the lower-leg frame, and performs operational control for the electric motor such that assisting force having the calculated direction and size can be obtained.

In one example of the third and fourth aspect, the rotational direction detecting mechanism is configured to have first and second rotation sensors for respectively detecting that the drive arm is rotated in the first and second directions around the drive-side pivot axis from the reference position.

In another example of the third and fourth aspect, the rotational direction detecting mechanism is configured to have a detection target that is rotated around the drive-side pivot axis together with the drive arm and a distance sensor for detecting a distance between the distance sensor and the detection target.

In the example, the detection target is configured to have a first region detected by the distance sensor when the drive arm is rotated in the first direction around the drive-side pivot axis from the reference position, and a second region detected by the distance sensor when the drive arm is rotated in the second direction around the drive-side pivot axis from the reference position. The distances of the first and second regions away from the distance sensor are different to each other.

In any one of the gait motion assisting apparatuses according to the present invention, the gait motion state detection sensor is capable of detecting an angle-related signal relating to a hip joint angle, which is a front-back swinging angle of the user's thigh.

In this case, the control device is configured to calculate a thigh phase angle at a sampling timing based on the angle-related signal that is input from the gait motion state detection sensor at a sampling timing, and calculate a gait motion timing during a gait cycle based on the thigh phase angle.

In order to achieve the object, a fifth aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a thigh gyro sensor for detecting a thigh swinging angle of the user; a lower-leg gyro sensor for detecting a lower-leg swinging angle of the user; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a thigh phase angle based on a detection signal that is input from the thigh gyro sensor at a sampling timing, calculating a gait motion timing during a gait cycle based on the thigh phase angle, applying the calculated gait motion timing to one of the left-leg assisting force control data and the right-leg assisting force control data to calculate the direction and the size of assisting force to be imparted to the lower-leg frame, and performing operational control for the electric motor such that assisting force having the calculated direction and size can be obtained, wherein the control device calculates a knee joint angle, which is a rotational angle of the lower leg relative to the thigh, based on the thigh swinging angle from the thigh gyro sensor and the lower-leg swinging angle from the lower-leg gyro sensor, and, when the calculated knee joint angle is different from the knee joint angle attained when the lower leg is fully extended, selects the assisting force control data to be used among the left-leg assisting force control data and the right-leg assisting force control data based on the knee joint angle.

The gait motion assisting apparatus according to the fifth aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In order to achieve the object, a sixth aspect of the present invention provides a gait motion assisting apparatus applicable to a knee ankle foot orthosis including a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus including a casing having a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg; an electric motor accommodated in the casing and capable of outputting rotational power in both a first direction toward one side and a second direction toward the other side around an axis from an output shaft; a drive arm wherein, with a proximal end part being operatively connected to the output shaft so as to swing in the first direction toward one side and the second direction toward the other side around the drive-side pivot axis in accordance with an output of the output shaft in the first and second directions, respectively, and with the casing being connected to the knee ankle foot orthosis, a distal end part is directly or indirectly connected to the lower-leg frame so as to press the lower-leg frame around the brace-side pivot axis in accordance with the swing around the drive-side pivot axis; a thigh gyro sensor for detecting a thigh swinging angle of the user; a lower-leg gyro sensor for detecting a lower-leg swinging angle of the user; a notification means for notifying the user of presence of an error; and a control device having assisting force control data used when calculating a direction and a size of assisting force to be imparted to the lower-leg frame wherein the assisting force control data includes left-leg assisting force control data and right-leg assisting force control data respectively used when the knee ankle foot orthosis is attached to the left leg and the right leg of the user, calculating a thigh phase angle based on a detection signal that is input from the thigh gyro sensor at a sampling timing, calculating a gait motion timing during a gait cycle based on the thigh phase angle, applying the calculated gait motion timing to one of the left-leg assisting force control data and the right-leg assisting force control data to calculate the direction and the size of assisting force to be imparted to the lower-leg frame, and performing operational control for the electric motor such that assisting force having the calculated direction and size can be obtained, wherein the control device is configured to calculate a knee joint angle, which is a rotational angle of the lower leg relative to the thigh, based on the thigh swinging angle from the thigh gyro sensor and the lower-leg swinging angle from the lower-leg gyro sensor, and, when the calculated knee joint angle is different from the knee joint angle attained when the lower leg is fully extended, determine the assisting force control data to be used among the left-leg assisting force control data and the right-leg assisting force control data based on the knee joint angle, and, when the assisting force control data to be used is different from the assisting force control data selected by manual operation, notify the user of an error via the notification means.

The gait motion assisting apparatus according to the sixth aspect of the present invention makes it possible to effectively prevent a situation where the left or right of the user's leg to which the knee ankle foot orthosis with the gait motion assisting apparatus is actually attached does not match the left or right of the assisting force control data used when the control device of the gait motion assisting apparatus performs operational control for the electric motor, so that appropriate gait assisting force is provided.

In a preferable configuration of the sixth aspect, the control device is configured to suspend operation of the electric motor in addition to notifying of an error by the notification means when the assisting force control data determined to be used based on the calculated knee joint angle is different from the assisting force control data selected by manual operation.

Alternatively, in the sixth aspect, when the assisting force control data determined to be used based on the calculated knee joint angle is different from the assisting force control data selected by manual operation, the control device is configured to, in addition to notifying of an error by the notification means, employ the assisting force control data determined to be used based on the calculated knee joint angle in place of the assisting force control data selected by manual operation, apply the calculated gait motion timing to the assisting force control data to calculate a direction and a size of assisting force to be imparted to the lower-leg frame, and perform operational control for the electric motor such that assisting force having the calculated direction and size can be obtained.

EMBODIMENT FOR CARRYING OUT THE INVENTION

First Embodiment

Below, one embodiment of the gait motion assisting apparatus according to the present invention will now be described with reference to the attached drawings.

The gait motion assisting apparatus 100A according to the present embodiment imparts gait assisting force to a user wear a knee-ankle-foot orthosis 1, and is attachable to a knee-ankle-foot orthosis for left leg 1L and a knee-ankle-foot orthosis for right leg 1R.

First, the knee-ankle-foot orthosis 1 will now be described.

Figure 1B:
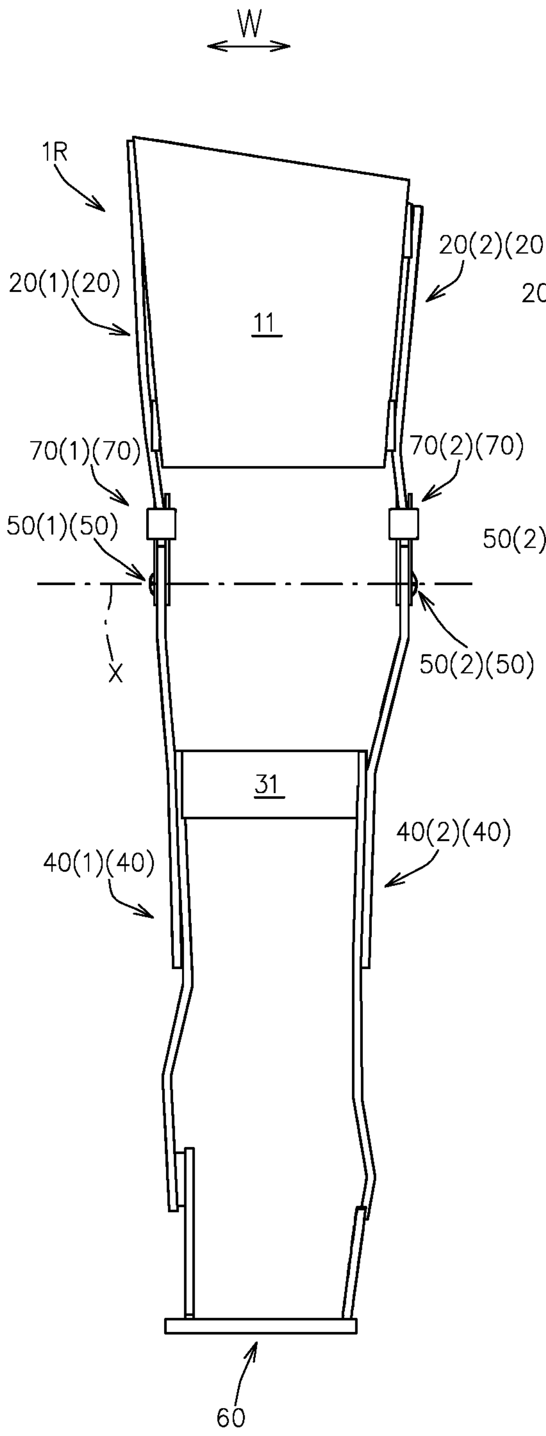
FIGS. 1A and 1B are front views of a knee-ankle-foot orthosis for left leg and a knee-ankle-foot orthosis for right leg, respectively, to which a gait motion assisting apparatus according to the present invention is attachable.
Figure 1A:
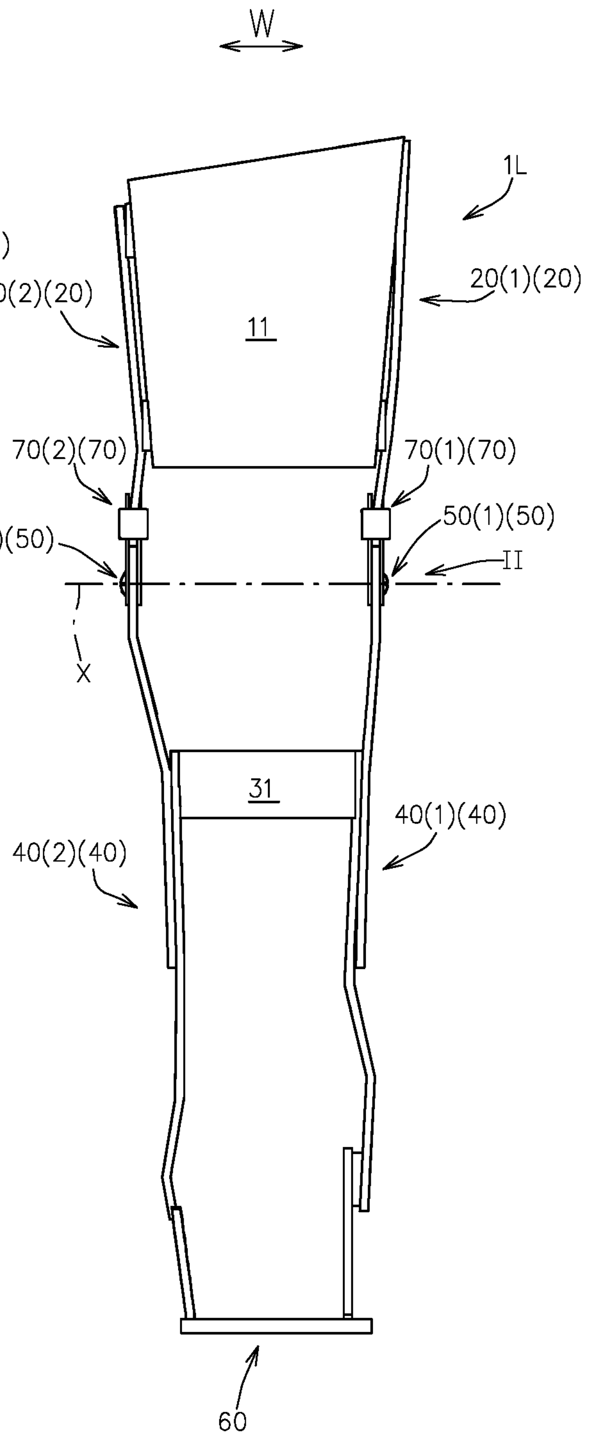

FIGS. 1A and 1B are front views of the knee-ankle-foot orthosis for left leg 1L and the knee-ankle-foot orthosis for right leg 1R that are attached to the user's left leg and right leg, respectively.

The knee-ankle-foot orthosis for left leg 1L and the knee-ankle-foot orthosis for right leg 1R are symmetrical to each other with respect to a central vertical plane passing a body axis of the user and extending in the user's front-back direction.

The knee-ankle-foot orthosis 1 is a device to be worn by a person with leg disability or a person with paralysis due to a stroke or the like for gait assistance or for rehabilitation, and is custom-made according to the user's physique.

As shown in FIGS. 1A and 1B, the knee-ankle-foot orthosis 1 has a thigh attachment 11 to which the user's thigh is attached, a thigh frame 20 supporting the thigh attachment 11 and extending in a substantially vertical direction, a lower leg attachment 31 to which the user's lower leg is attached, and a lower leg frame 40 supporting the lower leg attachment 31 and extending in a substantially vertical direction.

The thigh attachment 11 and the lower leg attachment 31 may take various forms as long as they are respectively attachable to the user's thigh and lower leg.

In the present embodiment, the thigh attachment 11 is in a cylindrical form having an attachment hole with such a size that the user's thigh can be inserted and the thigh attachment 11 fits the thigh.

Likewise, the lower leg attachment 31 is in a cylindrical form having an attachment hole with such a size that the user's lower leg can be inserted and the lower leg attachment 31 fits the lower leg.

In the present embodiment, as shown in FIGS. 1A and 1B, the thigh frame 20 has a first thigh frame 20(1) vertically extending on the outer side of the thigh attachment 11 in the user width direction, and a second thigh frame 20(2) vertically extending on the inner side of the thigh attachment 11 in the user width direction.

Likewise, the lower leg frame 40 has a first lower leg frame 40(1) vertically extending on the outer side of the lower leg attachment 31 in the user width direction, and a second lower leg frame 40(2) vertically extending on the inner side of the lower leg attachment 31 in the user width direction.

Figure 2:
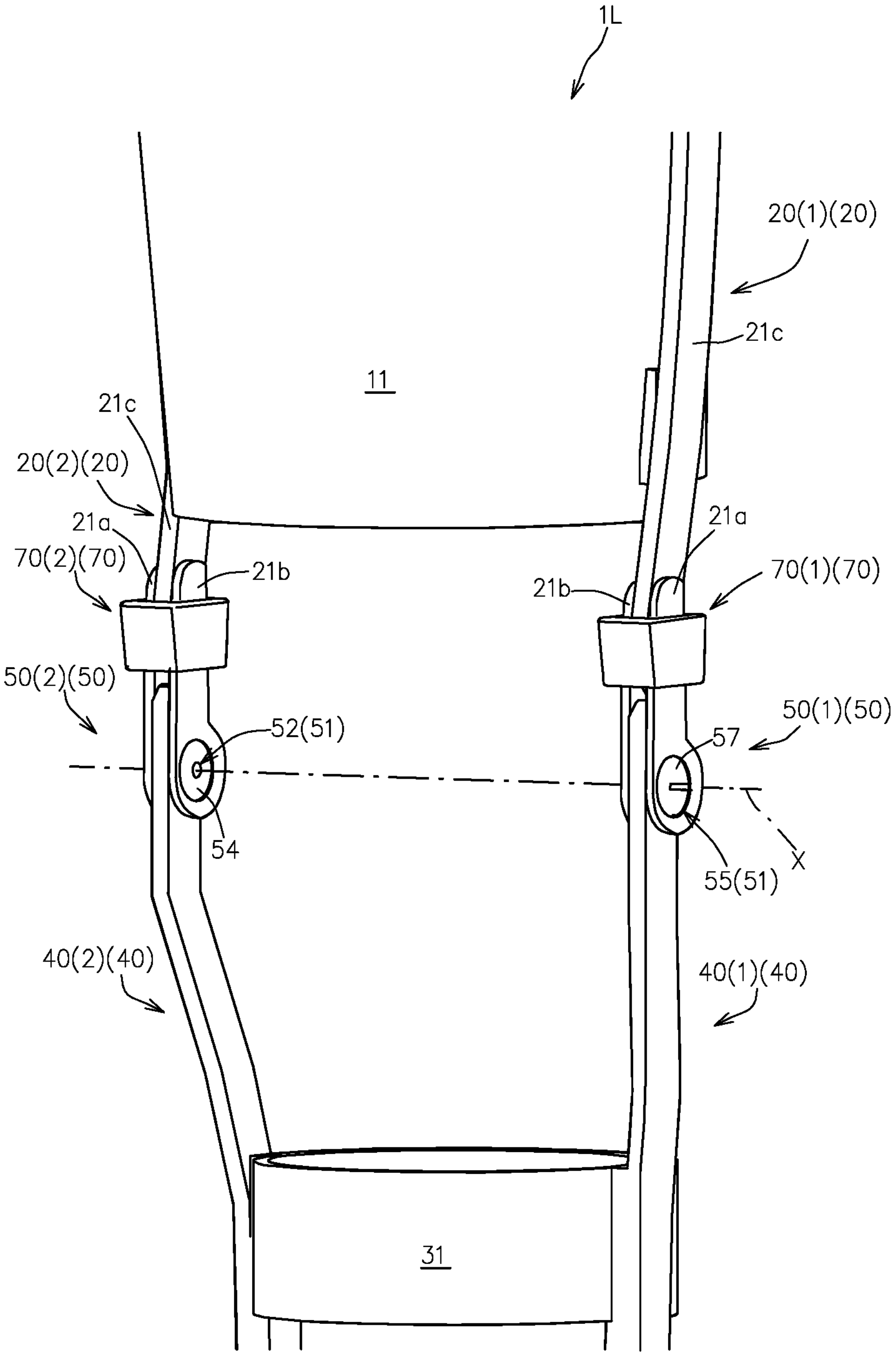
FIG. 2 is a perspective enlarged view of the II part in FIG. 1A.

FIG. 2 shows a perspective enlarged view of the II part in FIG. 1A.

Figure 3:
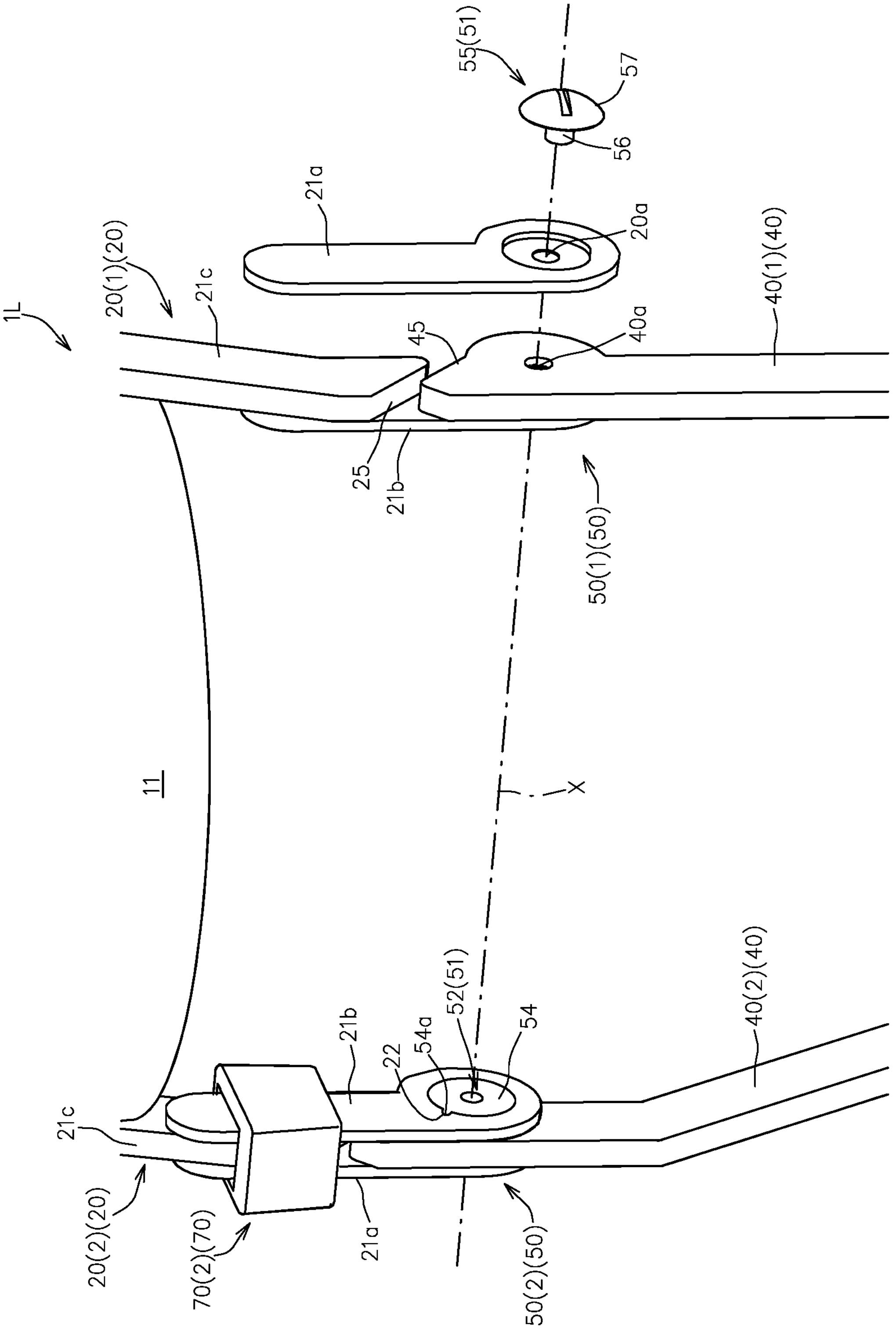
FIG. 3 is an exploded view of FIG. 2.

FIG. 3 shows an exploded view of FIG. 2.

In FIG. 3, illustration of a part of components is omitted for easier understanding.

Figure 4:
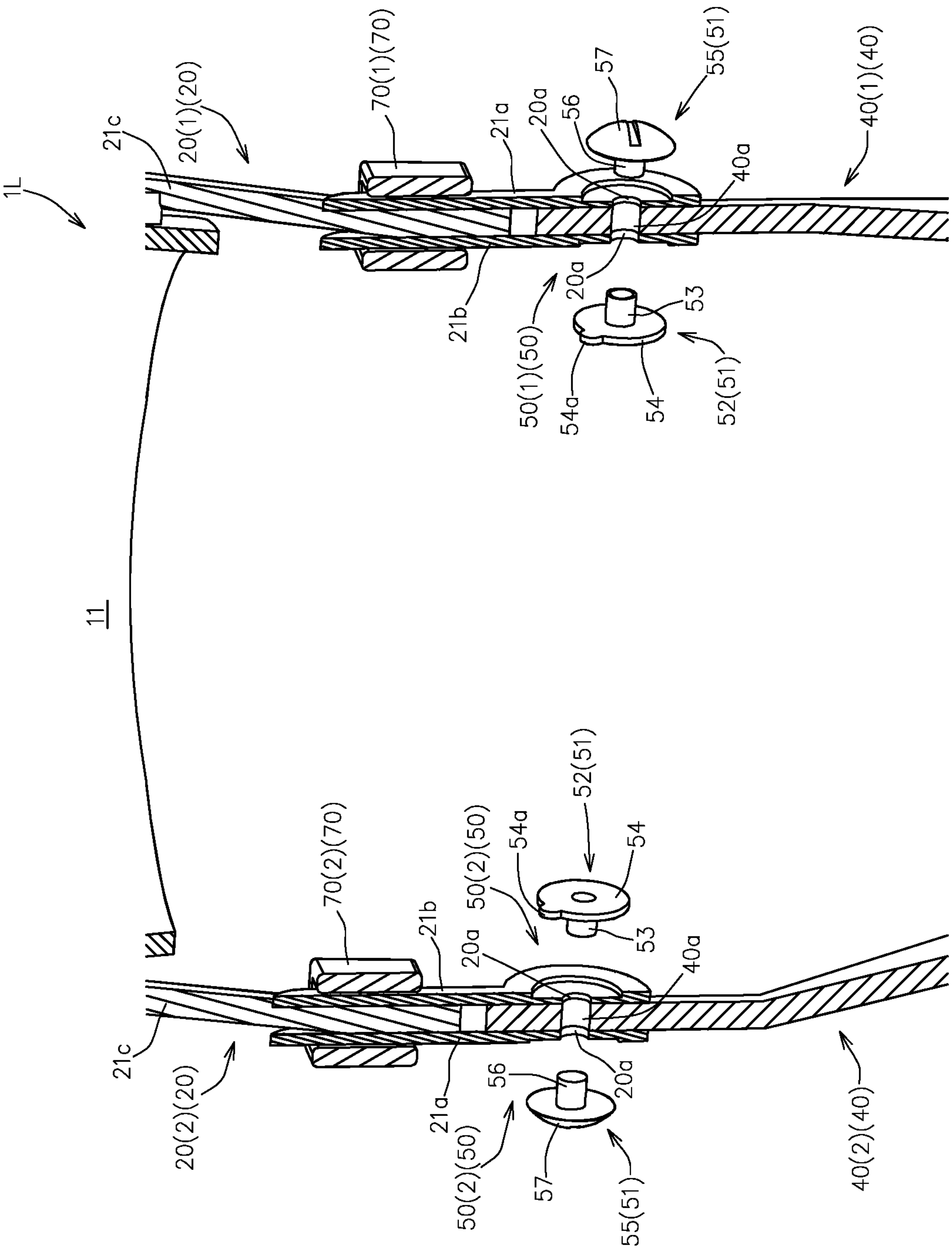
FIG. 4 is a vertical cross-sectional front view of FIG. 2.

FIG. 4 shows a vertical cross-sectional front view of FIG. 2.

As shown in FIGS. 1 to 4, the lower leg frame 40 is connected to the thigh frame 20 via a brace-side rotational connecting part 50 such that the lower leg frame 40 is rotatable relative to the thigh frame 20 around a brace-side pivot axis line X that is coaxial with the swing axis line of the user's knee joint.

As described above, in the present embodiment, the thigh frame 20 has the first and second thigh frames 20(1), 20(2), and the lower leg frame 40 has the first and second lower leg frames 40(1), 40(2).

In this case, an upper end portion of the first lower leg frame 40(1) is connected to a lower end portion of the first thigh frame 20(1) via a first brace-side rotational connecting part 50(1) so that the first lower leg frame 40(1) is rotatable around the brace-side pivot axis line X relative to the first thigh frame 20(1), and an upper end portion of the second lower leg frame 40(2) is connected to a lower end portion of the second thigh frame 20(2) via a second brace-side rotational connecting part 50(2) so that the second lower leg frame 40(2) is rotatable around the brace-side pivot axis line X relative to the second thigh frame 20(2).

Specifically, as shown in FIGS. 2 to 4, the thigh frame 20 has a vertically extending thigh frame main body 21*c* and a pair of connecting pieces 21*a*, 21*b* fixed to the respective sides in the user width direction of the lower end part of the frame main body 21*c* by pinning, welding, or the like. The upper part of the lower leg frame 40 is interposed between the pair of connecting pieces 21*a*, 21*b*.

The pair of connecting pieces 21*a*, 21*b* are provided with a thigh frame attachment hole 20*a* that is coaxially with the brace-side pivot axis line X, and the lower leg frame 40 is provided with a lower leg frame attachment hole 40*a* that is coaxially with the brace-side pivot axis line X.

The brace-side rotational connecting part 50 has a brace-side connector 51 for connecting the thigh frame 20 and the corresponding lower leg frame 40 so as to be rotatable around the brace-side pivot axis line X by being inserted into a brace-side frame attachment hole formed by the thigh frame attachment hole 20*a* and the lower leg frame attachment hole 40*a*.

As shown in FIGS. 2 to 4, the brace-side connector 51 has an internally threaded member 52 and an externally threaded member 55 separably screwed to each other within the brace-side frame attachment hole.

The internally threaded member 52 has a cylindrical part 53 to be inserted into the brace-side frame attachment hole from one side in the user width direction and a flange part 54 extending more radially outward than the brace-side frame attachment hole from one side in the user width direction of the cylindrical part 53. The cylindrical part 53 has a screw hole that is open toward the free end side.

On the other hand, the externally threaded member 55 has a cylindrical part 56 having an external thread to be screwed into the screw hole from the other side in the user width direction and a flange part 57 extending more radially outward than the brace-side frame attachment hole from the other side in the user width direction of the cylindrical part 56.

As shown in FIGS. 2 to 4, in the present embodiment, the internally threaded member 52 is inserted into the brace-side attachment hole from the side close to the user's thigh inserted into the thigh attachment 11, and the externally threaded member 55 is screwed to the internally threaded member 52 from the side far from the user's thigh.

Reference number 54*a* in FIGS. 3 and 4 is a radially outward projection that is provided on the flange part 53 and that engages with a depression 22 (see FIG. 3) formed in the inner connecting piece 21*b*, and thereby the internally threaded member 52 is retained so as to be incapable of relative rotation around the axis line relative to the inner connecting piece 21*b* (i.e., the thigh frame 20).

In the present embodiment, a swinging position of the lower leg frame 40 around the brace-side pivot axis line X at the time when the user's lower leg is extended until a maximum extending state defines a swinging end of the lower leg frame 40 toward the forward direction around the brace-side pivot axis line X relative to the thigh frame 20.

Specifically, as shown in FIG. 3, an upper-end surface 45 of the lower leg frame 40 (the end surface facing the thigh frame 20) is a sloped surface such that the radial distance from the brace-side pivot axis line X increases from one side toward the other side around the brace-side pivot axis line X, and a lower-end surface 25 of the thigh frame 20 (the end surface facing the lower leg frame 40) is a sloped surface corresponding to the upper-end surface 45 of the lower leg frame 40.

Due to this configuration, at the time when the user's lower leg is extended until a maximum extending state, the lower leg frame 40 rotates only toward one side around the brace-side pivot axis line X relative to the thigh frame 20 (in the direction in which the user's lower leg is bent relative to the thigh) and does not rotate toward the other side (in the direction in which the user's lower leg is extended relative to the thigh).

In the present embodiment, as shown in FIGS. 1 to 4, the knee-ankle-foot orthosis 1 further has a locking member 70 for inhibiting the rotation of the lower leg frame 40 toward both directions around the brace-side pivot axis line X relative to the thigh frame 20.

The locking member 70 is configured so as to be capable of reaching a locked state (the state shown in FIG. 2) where the thigh frame 20 and the lower leg frame 40 are surrounded by the locking member 70 to connect both frames 20, 40 and prevent the lower leg frame 40 from being relatively rotated around the brace-side pivot axis line X relative to the thigh frame 20, and a cancelled state where connection between the thigh frame 20 and the lower leg frame 40 is cancelled to permit the lower leg frame 40 to be relatively rotated around the brace-side pivot axis line X relative to the thigh frame 20.

In the present embodiment, the locking member 70 has a first locking member 70(1) acting on the first thigh frame 20(1) and the first lower leg frame 40(1), and a second locking member 70(2) acting on the second thigh frame 20(2) and the second lower leg frame 40(2).

In the present embodiment, as shown in FIG. 1, the knee-ankle-foot orthosis 1 further has a foot frame 60 on which a user places a foot.

In this case, the lower end portion of the lower leg frame 40 is connected to the foot frame 60.

Below, the gait motion assisting apparatus 100A according to the present embodiment will now be described.

Figure 5:
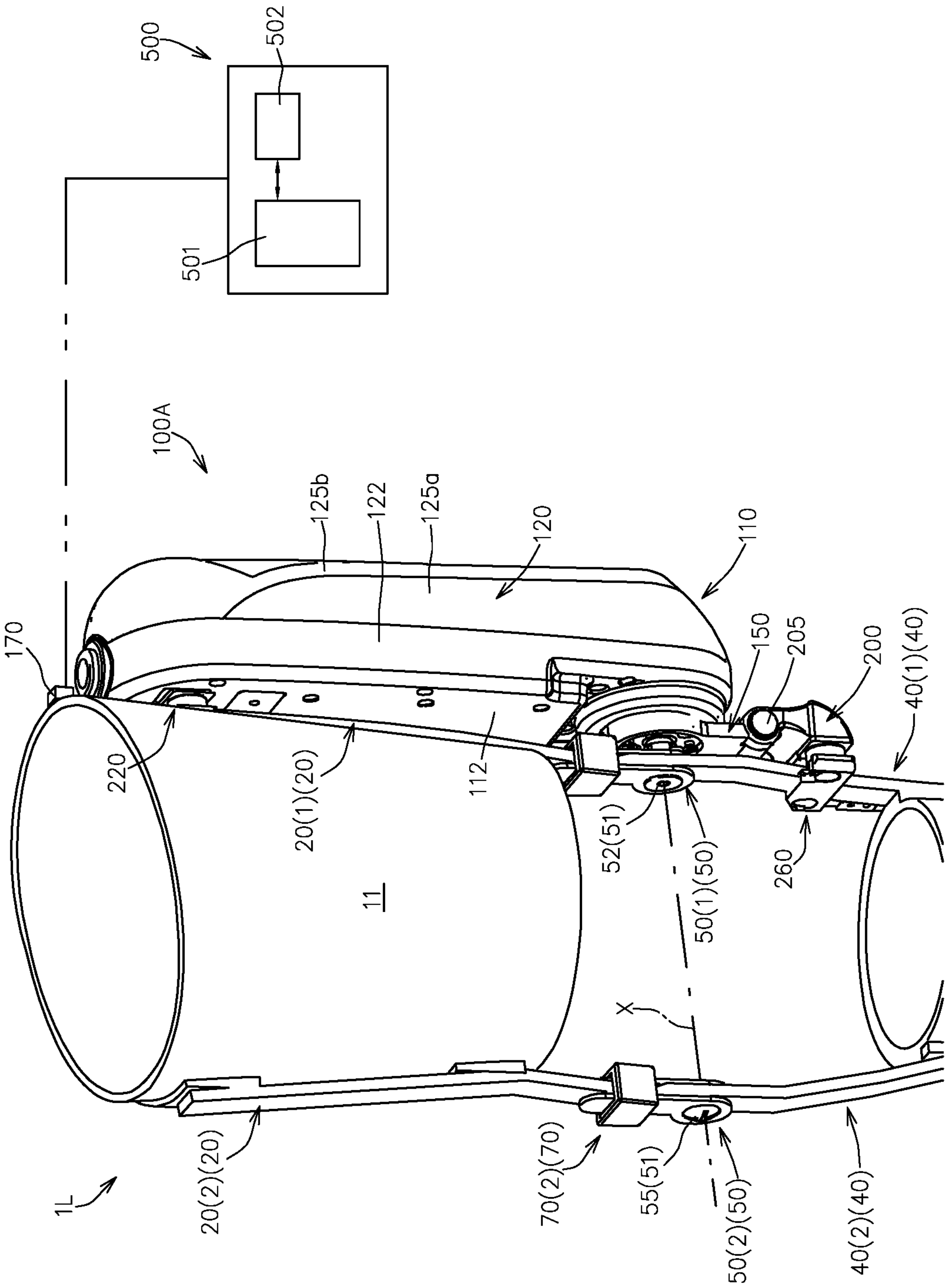
FIG. 5 is a perspective view of a gait motion assisting apparatus according to a first embodiment of the present invention attached to the knee-ankle-foot orthosis for left leg as viewed from the inner side in the user width direction and the forward side in the user front-back direction.

FIG. 5 is a perspective view of the gait motion assisting apparatus 100A attached to the knee-ankle-foot orthosis 1 as viewed from the inner side in the user width direction and the forward side in the user front-back direction.

Figure 6:
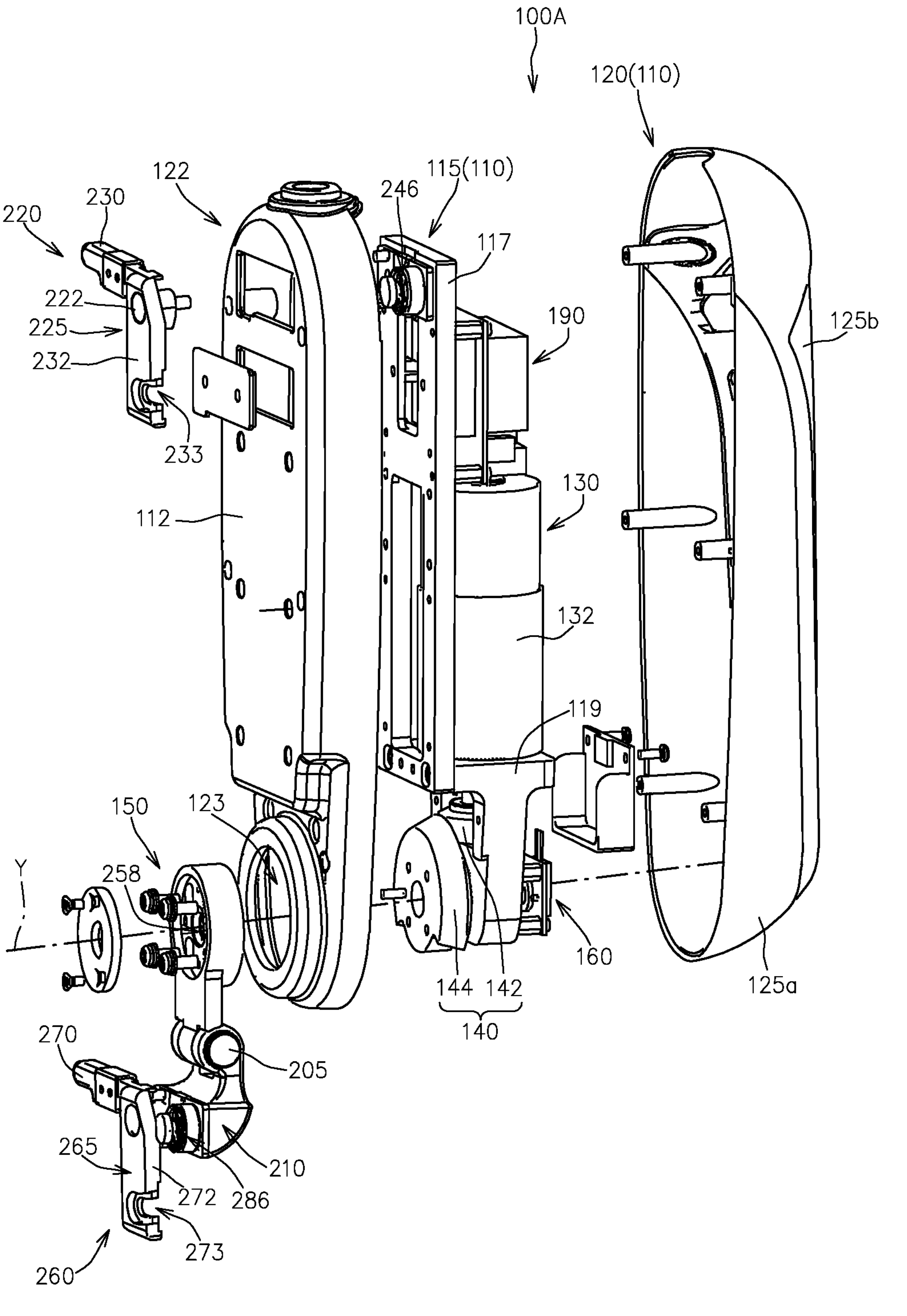
FIG. 6 is an exploded perspective view of the gait motion assisting apparatus as viewed from a side on a mounting surface (the inner side in the user width direction).

FIG. 6 is an exploded perspective view of the gait motion assisting apparatus 100A as viewed from a side facing the knee-ankle-foot orthosis 1.

Figure 7:
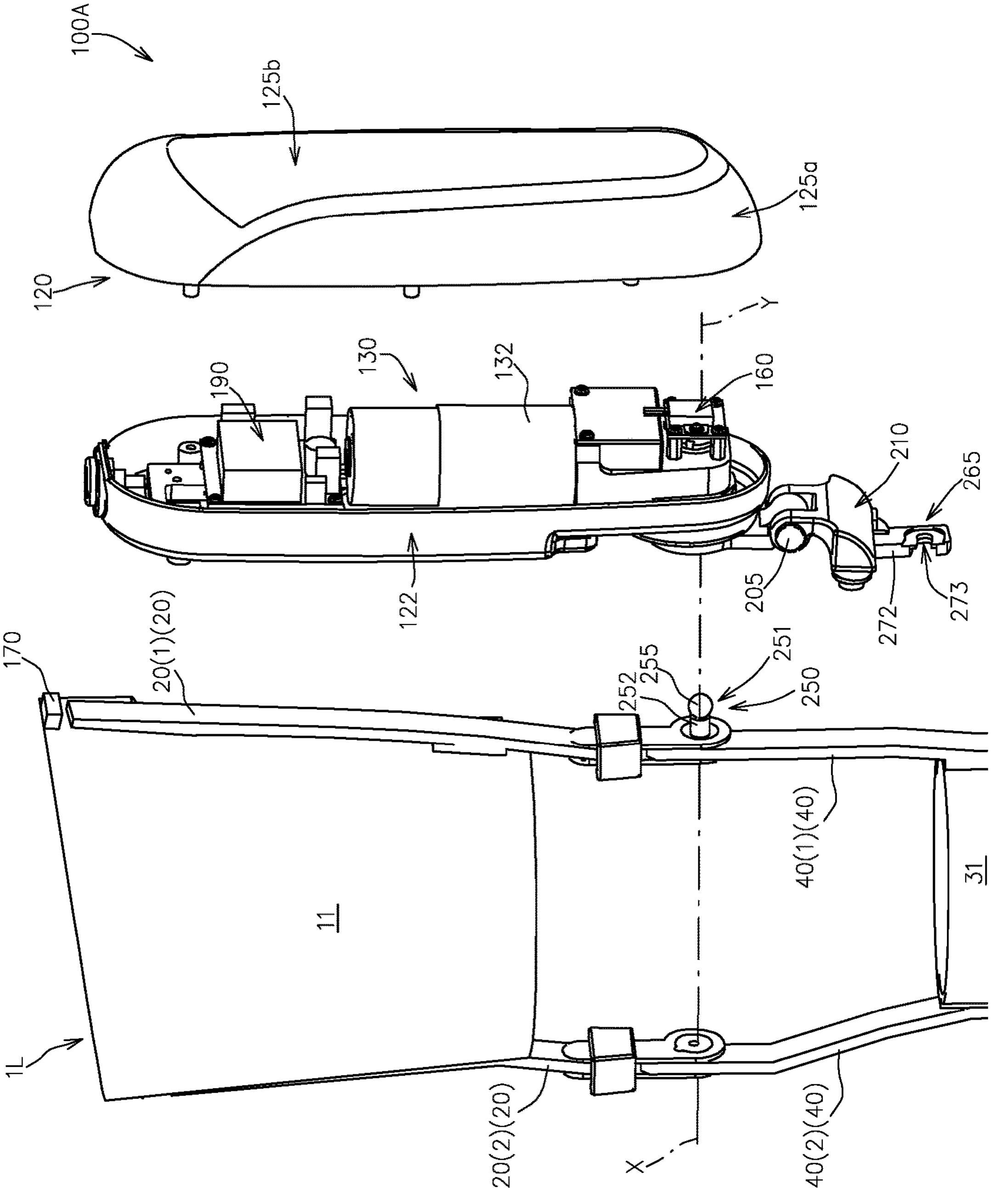
FIG. 7 is an exploded perspective view of the gait motion assisting apparatus and the knee-ankle-foot orthosis for left leg as viewed from the inner side in the user width direction.
Figure 8:
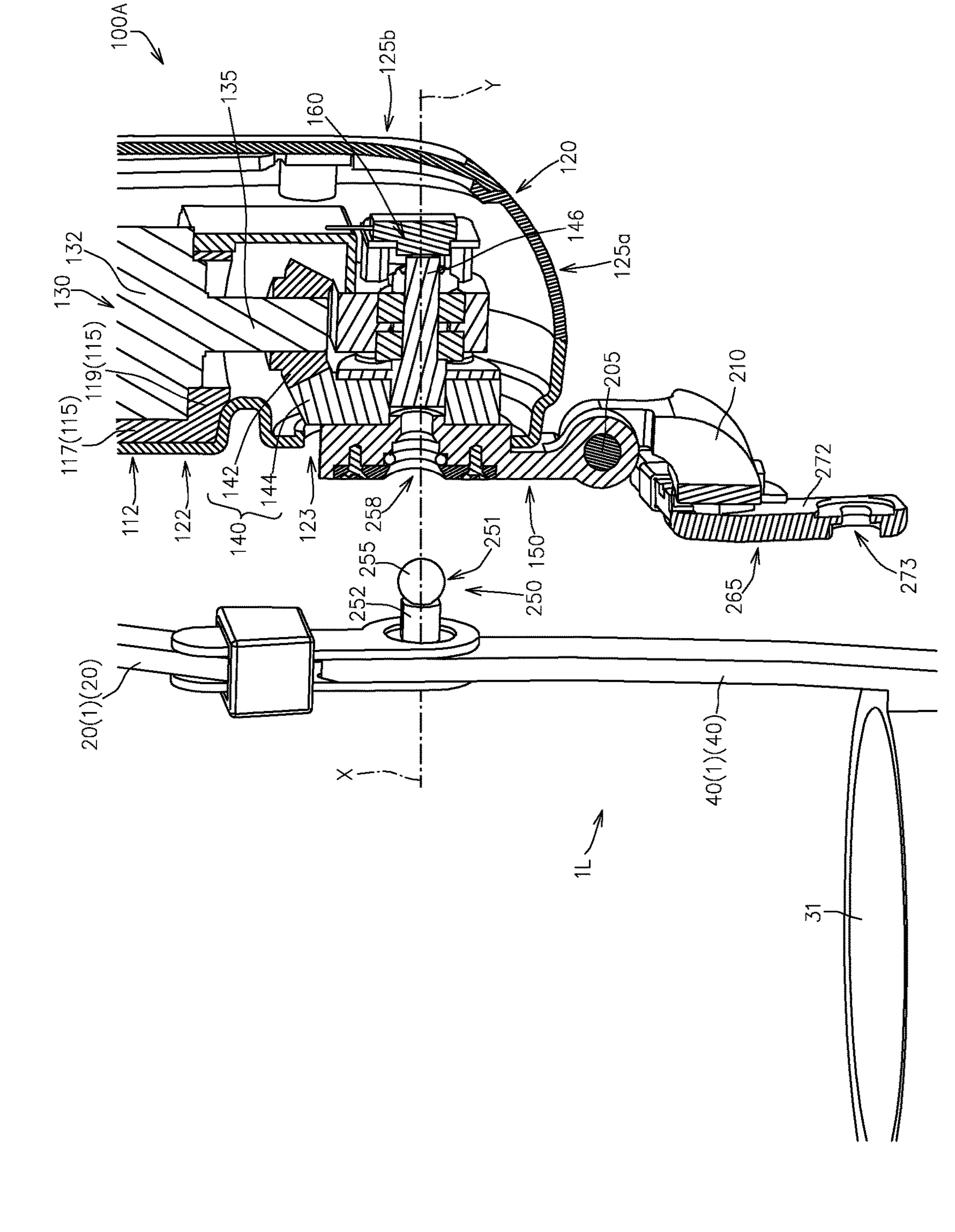
FIG. 8 is an exploded vertical cross-sectional view of the gait motion assisting apparatus and the knee-ankle-foot orthosis for left leg.

FIGS. 7 and 8 are an exploded perspective view and an exploded vertical cross-sectional view, respectively, of the gait motion assisting apparatus 100A and the knee-ankle-foot orthosis 1 as viewed from the inner side in the user width direction and the forward side in the user front-back direction.

As shown in FIGS. 5 to 8, the gait motion assisting apparatus 100A includes a casing 110, an electric motor 130 stored in the casing 110, a drive arm 150 operatively driven and swung by the electric motor 130, a rotation angle sensor 160 for detecting a swinging position of the drive arm 150, a gait motion state detecting sensor 170 for detecting a gait motion state during a gait cycle, and a control device 500 performing operational control of the electric motor 130.

The casing 110 has a frame 115 supporting the electric motor, and a cover 120 surrounding the frame 115 and the electric motor 130.

The frame 115 includes a vertical-direction extending wall 117 extending substantially vertically under the condition where the casing 110 is attached to the knee-ankle-foot orthosis 1, and a horizontal-direction extending wall 119 extending substantially horizontally from the vertical-direction extending wall 117.

The cover 120 includes a lower cover 122 forming a mounting surface 112 that faces the first thigh frame 20(1), and an upper cover 125 detachably connected to the lower cover 122 so as to form an accommodating space that accommodates the frame 115 and the electric motor 130 in cooperation with the lower cover 122.

In the present embodiment, the frame 115 is fixed within the accommodating space by connecting the vertical-direction extending wall 117 to an inner surface of the lower cover 122 via fastening members such as bolts.

In the present embodiment, the upper cover 125 includes a first upper cover 125*a* detachably connected to the lower cover 122, and a second upper cover 125*b* detachably connected to the first upper cover 125*a*.

The electric motor 130 includes a motor body 132 and an output shaft 135 connected to the motor body 132, and is configured so as to output driving force in both rotational directions including a first direction that is one side around an axial line and a second direction that is the other side around the axial line from the output shaft 135.

In the present embodiment, the motor body 132 is mounted on the horizontal-direction extending wall 119 to be supported by the frame 115. The output shaft 135 extends downward from the motor body 132 across the horizontal-direction extending wall 119.

As shown in FIGS. 6 and 7, the gait motion assisting apparatus 100A according to the present embodiment further includes a driving source 190 for the electric motor 130 such as a battery.

The driving source 190 is supported by the vertical-direction extending wall 117 so as to be arranged above the electric motor 130.

The drive arm 150 is operatively connected to the output shaft 135, and is swung in a first direction that is one side and a second side that is the other side around an actuator-side pivot axis line Y in response to the driving force in the first and second directions of the output shaft 135.

As shown in FIG. 8, in the present embodiment, the drive arm 150 is operatively connected to the output shaft 135 via a gear transmission mechanism 140.

The gear transmission mechanism 140 includes a driving-side bevel gear 142 supported by the output shaft 135 so as to be incapable of relative rotation, and a driven-side bevel gear 144 arranged coaxially with the actuator-side pivot axis line Y while being engaged with the driving-side bevel gear 142.

The driven-side bevel gear 144 is arranged closer to the knee-ankle-foot orthosis 1 in the user width direction W than the output shaft 135 is.

The proximal end portion of the drive arm 150 is connected to the driven-side bevel gear 144 so that the drive arm 150 is swung around the actuator-side pivot axis line Y in response to the driving power of the output shaft 135.

As shown in FIG. 8, the lower cover 122 is provided with an access opening 123. The driven-side bevel gear 144 and the proximal end portion of the drive arm 150 are connected to each other via the access opening 123.

A distal end portion of the drive arm 150 is operatively connected to the first lower leg frame 40(1) in a state that the gait motion assisting apparatus 100A is attached to the knee-ankle-foot orthosis 1 so that the drive arm 150 presses the first lower leg frame 40(1) around the brace-side pivot axis line X in response to the swing of the drive arm 150 around the actuator-side pivot axis line Y.

The operative connecting structure between the distal end portion of the drive arm 150 and the first lower leg frame 40(1) will be described below.

In the present embodiment, as shown in FIG. 8, a detected shaft 146 is connected to the driven-side bevel gear 144 so as to be incapable of relative rotation around the actuator-side pivot axis line Y. The rotation angle sensor 160 is arranged to detect a rotation angle of the detected shaft 146 around the axis line.

Next, the mounting structure of the gait motion assisting apparatus 100A to the knee-ankle-foot orthosis 1 will now be described.

The gait motion assisting apparatus 100A according to the present embodiment is detachably mounted to the knee-ankle-foot orthosis 1 at three portions including an upper portion, lower portion and an intermediate portion between the upper and lower portions in the vertical direction.

Specifically, the gait motion assisting apparatus 100A includes an upper connecting mechanism 220, a lower connecting mechanism 260 and an intermediate connecting mechanism 250.

As shown in FIG. 8, the intermediate connecting mechanism 250 includes a ball stud 251 arranged at the knee-ankle-foot orthosis 1, and an accommodation depression 258 that is arranged at the gait motion assisting apparatus 100A so that the ball stud 251 and the accommodation depression 258 forms a ball joint structure.

As shown in FIG. 8, the ball stud 251 is arranged at the knee-ankle-foot orthosis 1 so as to extend outward in the user width direction on the brace-side pivot axis line X.

Specifically, the ball stud 251 includes a shaft part 252 positioned coaxially with the brace-side pivot axis line X of the knee-ankle-foot orthosis 1 and extending in a direction toward the gait motion assisting apparatus 100A, and a spherical head part 255 provided at the distal end portion of the shaft part 252.

In the present embodiment, the ball stud 251 is provided on the knee-ankle-foot orthosis 1 in a projecting manner by utilizing the brace-side connector 51.

Specifically, as shown in FIGS. 4 and 8, the ball stud 251 is provided on the knee-ankle-foot orthosis 1 in a projecting manner by being screw-connected to an inner-side threaded member (the internally threaded member 52 in the present embodiment) positioned on the inner side in the user width direction among the internally threaded member 52 and the externally threaded member 55 in the swinging connector 51, in place of an outer-side threaded member (the externally threaded member 55 in the present embodiment) positioned on the outer side in the user width direction among the internally threaded member 52 and the externally threaded member 55.

The ball stud 251 and the inner-side threaded member are realized by various configurations.

For example, the ball stud 251 may be formed with an axial stepped hole passing through in the axial line direction. The axial stepped hole includes a large-diameter portion open toward a side on which the spherical head part 255 is positioned, a small-diameter portion open toward a side far away from the spherical head part 255 in the axial line direction, and a step connecting the large-diameter portion and the small-diameter portion. The ball stud 251 and the inner-side threaded member can be connected to each other by a fastening member such as a bolt inserted in the axial stepped hole and fastened to the inner-side threaded member.

According to this configuration, the ball stud 251 can be easily provided on the existing knee-ankle-foot orthosis 1 in a projecting manner so as to be coaxial with the brace-side pivot axis line X.

In the present embodiment, as shown in FIG. 8, the accommodation depression 258 is formed in the proximal end portion of the drive arm 150.

Figure 9:
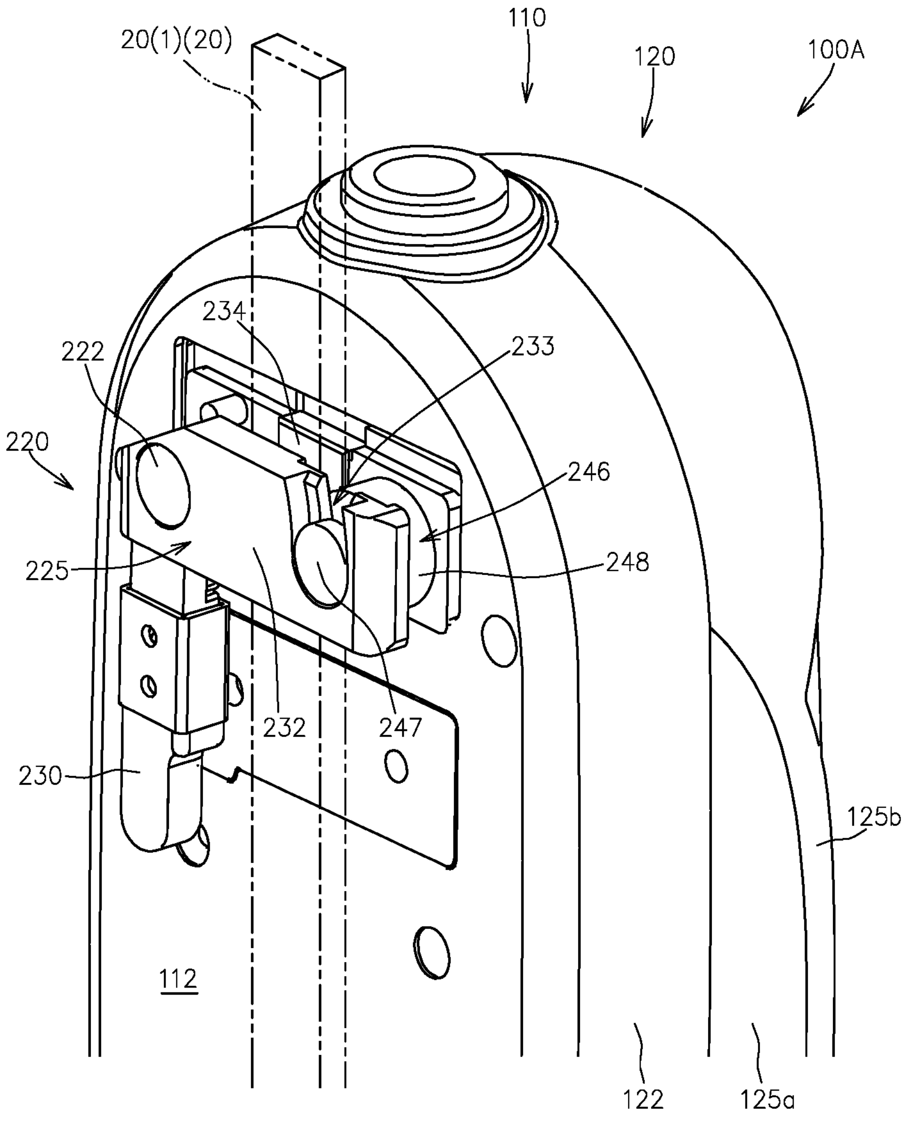
FIG. 9 is a perspective view of the vicinity of an upper connecting mechanism of the gait motion assisting apparatus, and shows a state that an upper fastening member of the upper connecting mechanism is positioned in a fastening position.

The configuration makes it possible to stably cause the brace-side pivot axis line X and the actuator-side pivot axis line Y to be arranged coaxially with each other while reducing the size of the gait motion assisting device 100A in the user width direction FIG. 9 is a perspective view of the vicinity of the upper connecting mechanism 220 in a state that the gait motion assisting apparatus 100A is attached to the first thigh frame 20(1).

In FIG. 9, the first thigh frame 20(1) is illustrated by the dashed double-dotted line.

As shown in FIG. 9, the upper connecting mechanism 220 includes an upper rotational shaft 222 provided on the mounting surface 112 so as to extend inward in the user width direction and an upper fastening member 225 supported by the upper rotational shaft 222 so as to be rotatable around an axis line of the upper rotational shaft 222.

Figure 10:
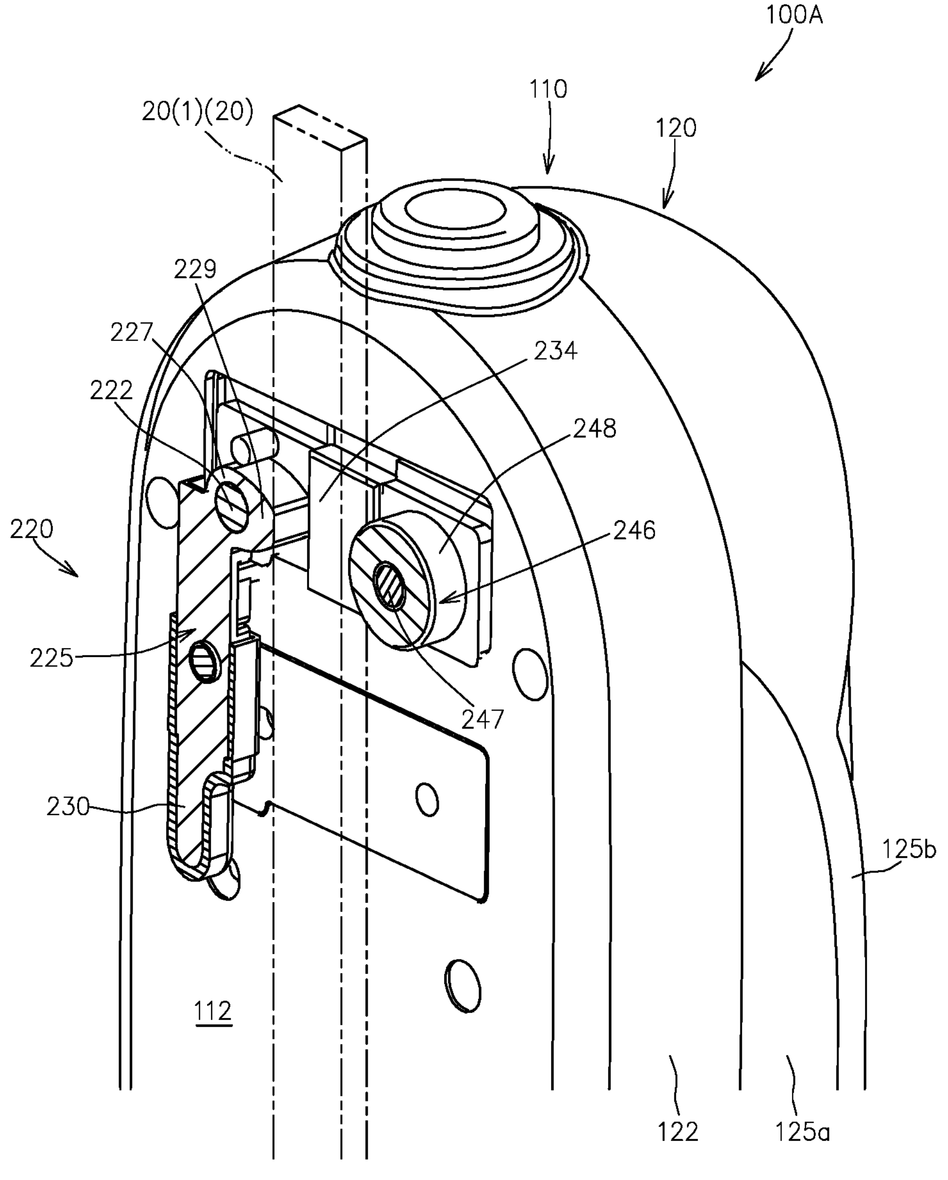
FIG. 10 is a vertical cross-sectional view of FIG. 10.

FIG. 10 is a perspective view of the vicinity of the upper connecting mechanism 220 with the upper fastening member 225 being cut in a vertical direction.

As shown in FIG. 10, the upper fastening member 225 includes a bearing part 227 supported by the upper rotational shaft 222 and a cam part 229 extending radially outward from the bearing part 227.

The cam part 229 is configured such that the radial distance between the outer circumferential surface of the cam part 229 and the axis line of the upper rotational shaft 222 is increased toward a first side around the axis line of the upper rotational shaft 222.

As shown in FIGS. 9 and 10, the upper connecting mechanism 220 further includes an upper receiving member 246 provided on the mounting surface 112 at a position spaced apart in the user front-back direction from the upper rotational shaft 222 by a distance that enables the first thigh frame 20(1) to be interposed between the upper receiving member 246 and the upper rotational shaft 222.

In the present embodiment, the upper connecting mechanism 220 includes an upper receiving shaft 247 provided on the mounting surface 112 so as to extend inward in the user width direction, and an elastic roller 248 supported by the upper receiving shaft 247 acts as the upper receiving member 246.

Figure 11:
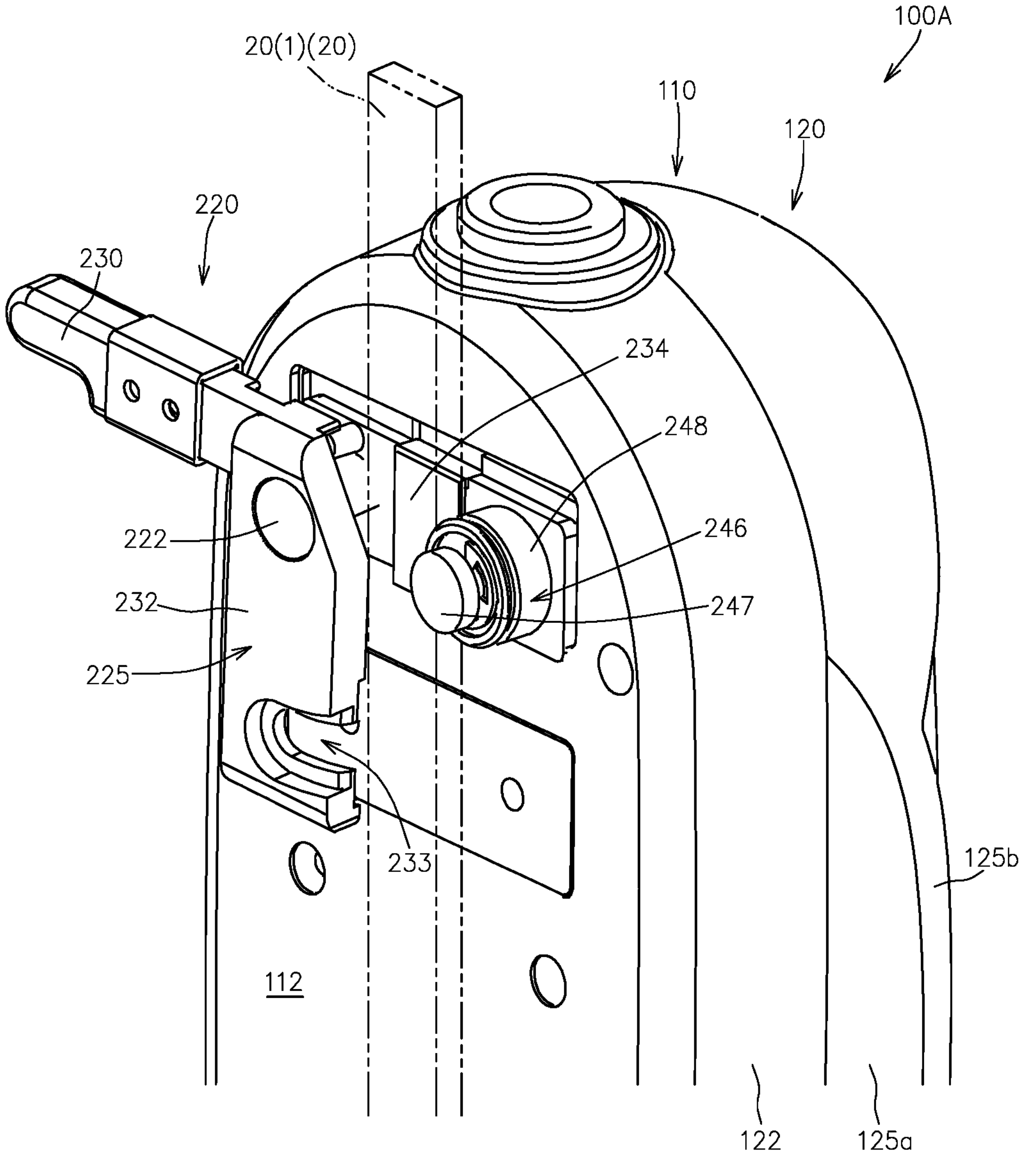
FIG. 11 is a perspective view corresponding to FIG. 9, and show a state where the upper fastening member is positioned in a releasing position.
Figure 12:
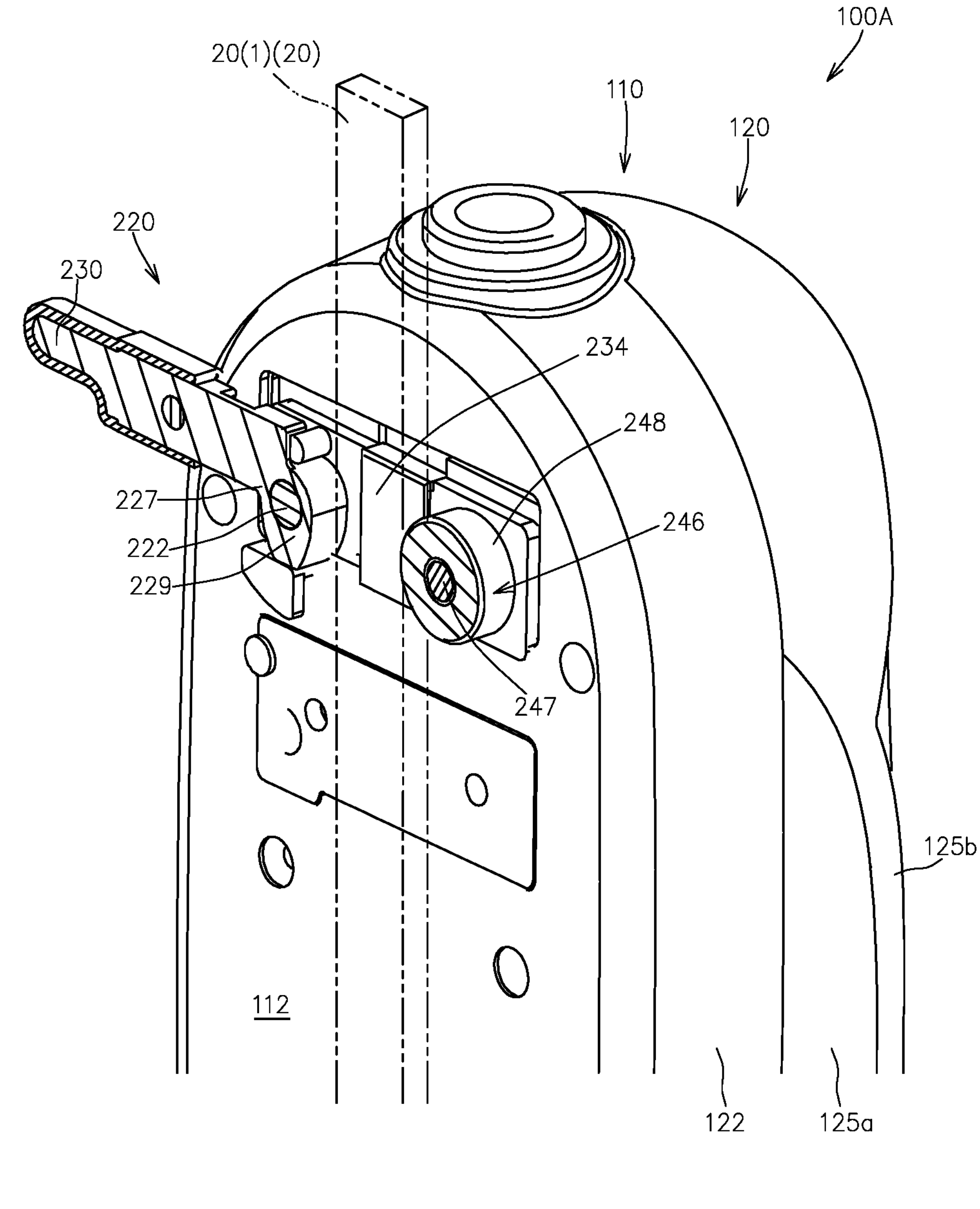
FIG. 12 is a vertical cross-sectional view of FIG. 11.

FIGS. 11 and 12 are perspective views corresponding to FIGS. 9 and 10, respectively, and show the state where the upper fastening member 225 is positioned in a predetermined releasing position around the upper rotational shaft 222.

As shown in FIGS. 11 and 12, in the state where the upper fastening member 225 is positioned in the releasing position around the upper rotational shaft 222, moving the gait motion assisting device 100A in a direction toward the knee-ankle-foot orthosis 1 enables the first thigh frame 20(1) to be positioned in the space between the upper fastening member 225 and the upper receiving member 246, and in the state where the first thigh frame 20(1) is positioned in the space, moving the gait motion assisting device 100A in a direction away from the knee-ankle-foot orthosis 1 enables the first thigh frame 20(1) to be retreated from the space.

Moreover, in the state where the first thigh frame 20(1) is positioned in the space, rotating the upper fastening member 225 from the releasing position (FIGS. 11 and 12) to a fastening position (FIGS. 9 and 10) around the upper rotational shaft 222 causes the cam part 229 to hold the first thigh frame 20(1) in cooperation with the upper receiving member 246 with respect to the user front-back direction, and thereby the state where the upper part of the gait motion assisting device 100A is connected to the first thigh frame 20(1) is attained.

As shown in FIGS. 9 to 12, in the present embodiment, the upper fastening member 225 further includes an operation arm 230 extending radially outward from the bearing part 227.

The operation arm 230 is configured such that the radial length between the free end of the operation arm 230 and the axis line of the upper rotational shaft 222 is greater than the radial length between the radially outermost end of the cam part 229 and the axis line of the upper rotational shaft 222.

This configuration, while making it easy to rotate the upper fastening member 225 around the upper rotational shaft 222 via the operation arm 230, makes it possible to effectively prevent connection between the upper part of the gait motion assisting device 100A and the first thigh frame 20(1) from being cancelled by the rotation of the upper fastening member 225 around the upper rotational shaft 222 via the cam part 229 when external force is unintentionally applied to the first thigh frame 20(1) and the upper part of the gait motion assisting device 100A.

As shown in FIGS. 9 and 11, in the present embodiment, the upper fastening member 225 has an engagement arm 232 extending radially outward from the bearing part 227 on the inner side in the user width direction than the cam part 229.

The engagement arm 232 is provided on the upper fastening member 225 so as to be positioned on the inner side in the user width direction than the first thigh frame 20(1) positioned in the space between the upper fastening member 225 and the upper receiving member 246.

The engagement arm 232 is provided with an engagement groove 233 for engagement with a portion of the upper receiving shaft 247, which extends more inward in the user width direction than the upper receiving member 246, when the upper fastening member 225 is rotated around the upper rotational shaft 222 from the releasing position to the fastening position around upper rotational shaft 222 so that the cam part 229 holds the first thigh frame 20(1) with respect to the user front-back direction in cooperation with the upper receiving member 246, and by the inward extending portion of the upper receiving shaft 247 inserted in the engagement groove 233, the unintentional relative movement of the upper part of the gait motion assisting device 100A and the first thigh frame 20(1) in the user width direction is prevented.

Reference number 234 in FIGS. 9 to 12 denotes a spacer for filling a gap existed between the first thigh frame 20(1) and the mounting surface 112 of the gait motion assisting device 100A with respect to the user width direction when the first thigh frame 20(1) is positioned in the space between the upper fastening member 225 and the upper receiving member 246 and the upper fastening member 225 is positioned in the fastening position. The spacer is preferably a rubber body.

Next, the lower connecting mechanism 260 will be now described.

Figure 13:
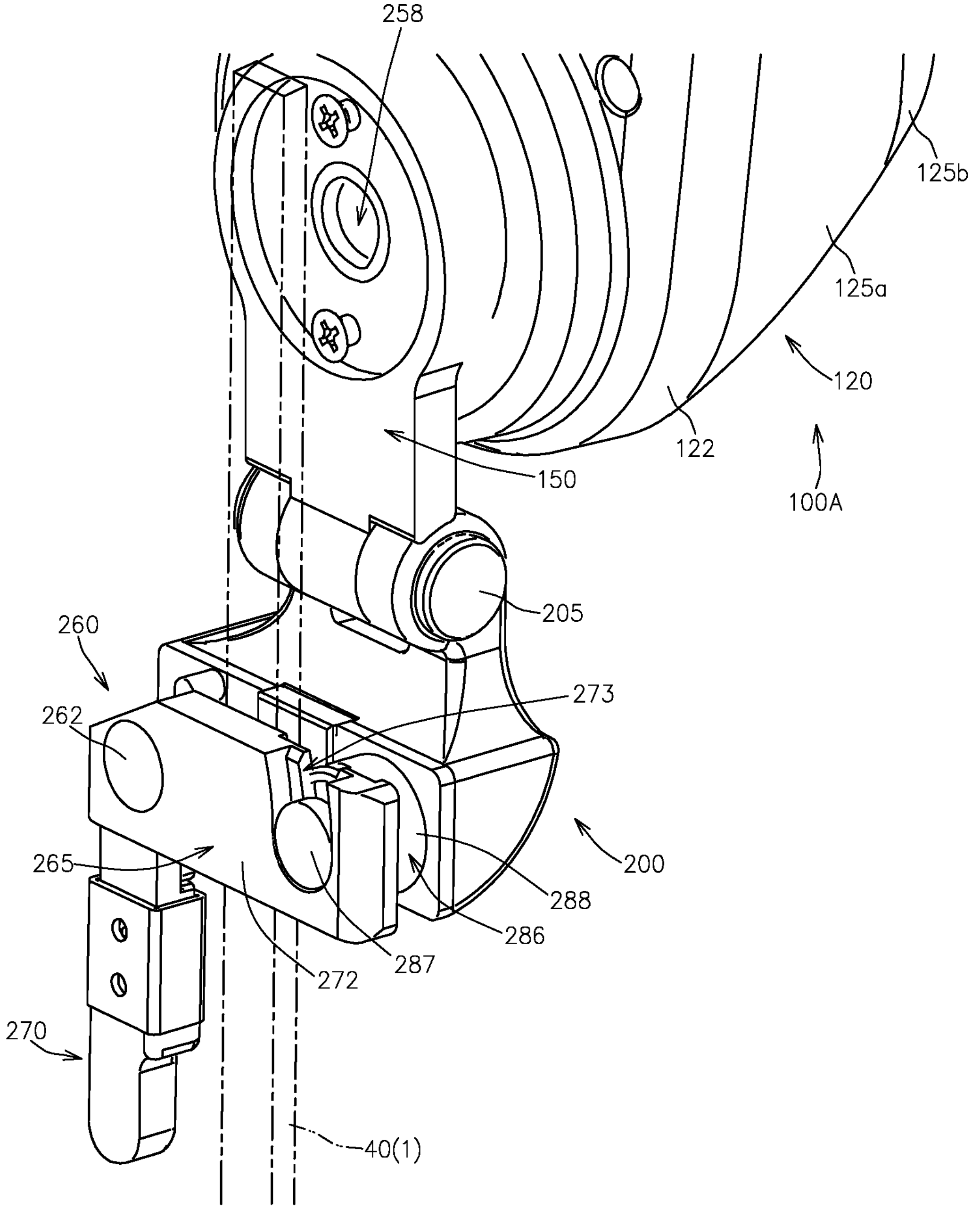
FIG. 13 is a perspective view of the vicinity of a lower connecting mechanism of the gait motion assisting apparatus, and shows a state that a lower fastening member of the lower connecting mechanism is positioned in a fastening position.

FIG. 13 shows a perspective view of the vicinity of the lower connecting mechanism 260.

In FIG. 13, the first lower leg frame 40(1) is illustrated by the dashed double-dotted line.

As shown in FIGS. 5 to 8 and 13, in the present embodiment, the distal end portion of the drive arm 150 is provided with a swinging member 200 capable of swinging around a rotational shaft 205 along the user front-back direction, and the lower connecting mechanism 260 is provided in the swinging member 200.

The configuration makes it possible to appropriately change the relative position of the lower connecting mechanism 260 with respect to the upper connecting mechanism 220 and the intermediate connecting mechanism 250 in the user width direction so that the gait motion assisting device 100A can be appropriately attached to the variously shaped knee-ankle-foot orthoses 1 that are custom-made according to the user's physique.

That is, the knee-ankle-foot orthosis 1 is custom-made according to the user's physique, and thus the tilt angle and/or the curvature of the first thigh frame 20(1) relative to the first lower leg frame 40(1) with respect to the user width direction W (see FIG. 1) is different for each knee-ankle-foot orthosis 1.

In this regard, adopting the configuration in which the swinging member 200 is connected to the distal end portion of the drive arm 150 so as to be capable of swinging in the user width direction and the lower connecting mechanism 260 is provided in the swinging member 200 enables the gait motion assisting device 100A to be appropriately attached to various knee-ankle-foot orthoses 1 having different tilt angles and/or curvatures of the first thigh frame 20(1) relative to the first lower leg frame 40(1) with respect to the user width direction W.

The lower connecting mechanism 260 has the substantially same configuration as the upper connecting mechanism 220.

Specifically, as shown in FIG. 13, the lower connecting mechanism 260 includes a lower rotational shaft 262 provided on the swinging member 200 so as to extend inward in the user width direction and a lower fastening member 265 supported by the lower rotational shaft 262 so as to be rotatable around an axis line of the lower rotational shaft 262.

Figure 14:
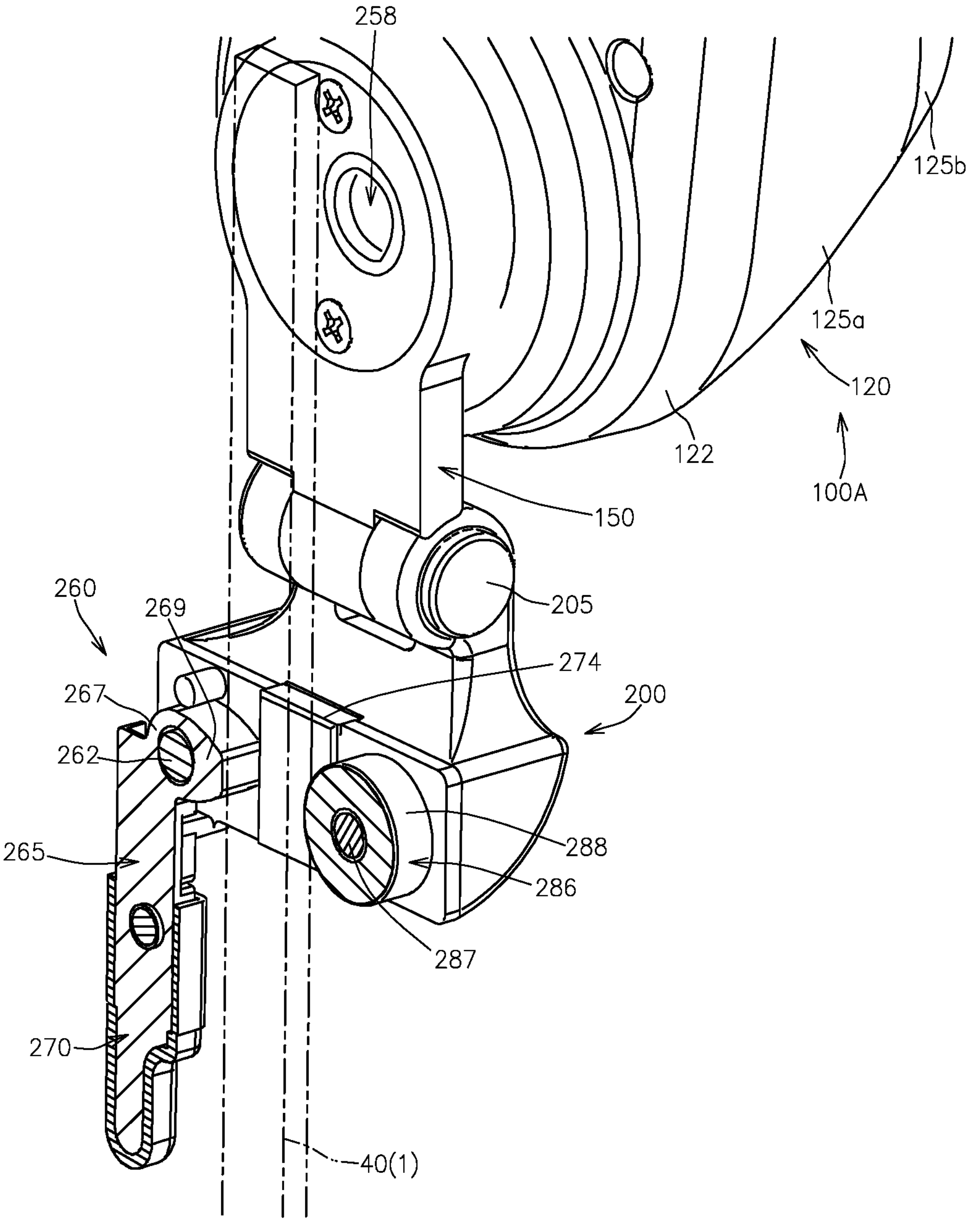
FIG. 14 is a vertical cross-sectional view of FIG. 13.

FIG. 14 is a perspective view of the vicinity of the lower connecting mechanism 260 with the lower fastening member 265 being cut in a vertical direction.

As shown in FIG. 14, the lower fastening member 265 includes a bearing part 267 supported by the lower rotational shaft 262 and a cam part 269 extending radially outward from the bearing part 267.

The cam part 269 is configured such that the radial distance between the outer circumferential surface of the cam part 269 and the axis line of the lower rotational shaft 262 is increased toward a first side around the axis line of the lower rotational shaft 262.

As shown in FIGS. 13 and 14, the lower connecting mechanism 260 further includes a lower receiving member 286 supported by the swinging member 200 at a position spaced apart in the user front-back direction from the lower rotational shaft 262 by a distance that enables the first lower leg frame 40(1) to be interposed between the lower receiving member 286 and the lower rotational shaft 262.

In the present embodiment, the lower connecting mechanism 260 includes a lower receiving shaft 287 provided on the swinging member 200 so as to extend inward in the user width direction, and an elastic roller 288 supported by the lower receiving shaft 287 acts as the lower receiving member 286.

Figure 15:
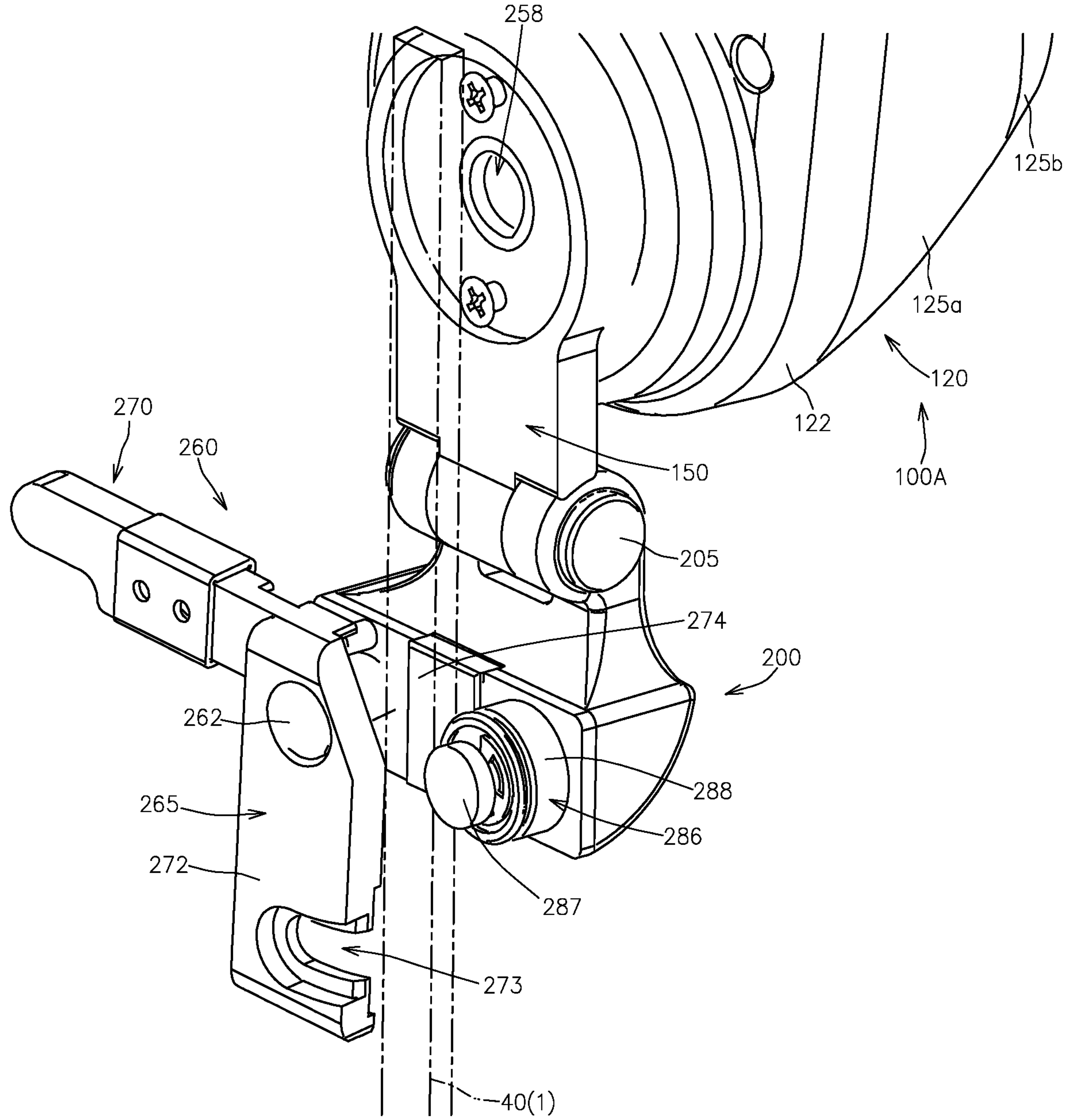
FIG. 15 is a perspective view corresponding to FIG. 3, and show a state where the lower fastening member is positioned in a releasing position.

FIG. 15 is a perspective view corresponding to FIG. 13, and shows the state where the lower fastening member 265 is positioned in a predetermined releasing position around the lower rotational shaft 262.

As shown in FIG. 15, in the state where the lower fastening member 265 is positioned in the releasing position around the lower rotational shaft 262, moving the gait motion assisting device 100A in a direction toward the knee-ankle-foot orthosis 1 enables the first lower leg frame 40(1) to be positioned in the space between the lower fastening member 265 and the lower receiving member 286, and in the state where the first lower leg frame 40(1) is positioned in the space, moving the gait motion assisting device 100A in a direction away from the knee-ankle-foot orthosis 1 enables the first lower leg frame 40(1) to be retreated from the space.

Moreover, in the state where the first lower leg frame 40(1) is positioned in the space, rotating the lower fastening member 265 from the releasing position (FIG. 15) to a fastening position (FIGS. 13 and 14) around the lower rotational shaft 262 causes the cam part 269 to hold the first lower leg frame 40(1) in cooperation with the lower receiving member 286 with respect to the user front-back direction, and thereby the state where the lower part of the gait motion assisting device 100A is connected to the first lower leg frame 40(1) is attained.

As shown in FIGS. 13 to 15, in the present embodiment, the lower fastening member 265 further includes an operation arm 270 extending radially outward from the bearing part 267.

The operation arm 270 is configured such that the radial length between the free end of the operation arm 270 and the axis line of the lower rotational shaft 262 is greater than the radial length between the radially outermost end of the cam part 269 and the axis line of the lower rotational shaft 262.

This configuration, while making it easy to rotate the lower fastening member 265 around the lower rotational shaft 262 via the operation arm 270, makes it possible to effectively prevent connection between the lower part of the gait motion assisting device 100A and the first lower leg frame 40(1) from being cancelled by the rotation of the lower fastening member 265 around the lower rotational shaft 262 via the cam part 269 when external force is unintentionally applied to the first lower leg frame 40(1) and the lower part of the gait motion assisting device 100A.

As shown in FIGS. 13 to 15, in the present embodiment, the lower fastening member 265 has an engagement arm 272 extending radially outward from the bearing part 267 on the inner side in the user width direction than the cam part 269.

The engagement arm 272 is provided on the lower fastening member 265 so as to be positioned on the inner side in the user width direction than the first lower leg frame 40(1) positioned in the space between the lower fastening member 265 and the lower receiving member 286.

The engagement arm 272 is provided with an engagement groove 273 for engagement with a portion of the lower receiving shaft 287, which extends more inward in the user width direction than the lower receiving member 286, when the lower fastening member 265 is rotated around the lower rotational shaft 262 from the releasing position to the fastening position around lower rotational shaft 262 so that the cam part 269 holds the first lower leg frame 40(1) with respect to the user front-back direction in cooperation with the lower receiving member 286, and by the inward extending portion of the lower receiving shaft 287 inserted in the engagement groove 273, the unintentional relative movement of the lower part of the gait motion assisting device 100A and the first lower leg frame 40(1) in the user width direction is prevented.

Also, the lower connecting mechanism 260 is provided with a spacer for filling a gap existed between the first lower leg frame 40(1) and the swinging member 200 with respect to the user width direction when the first lower leg frame 40(1) is positioned in the space between the lower fastening member 265 and the lower receiving member 286 and the lower fastening member 265 is positioned in the fastening position.

Figure 16A:
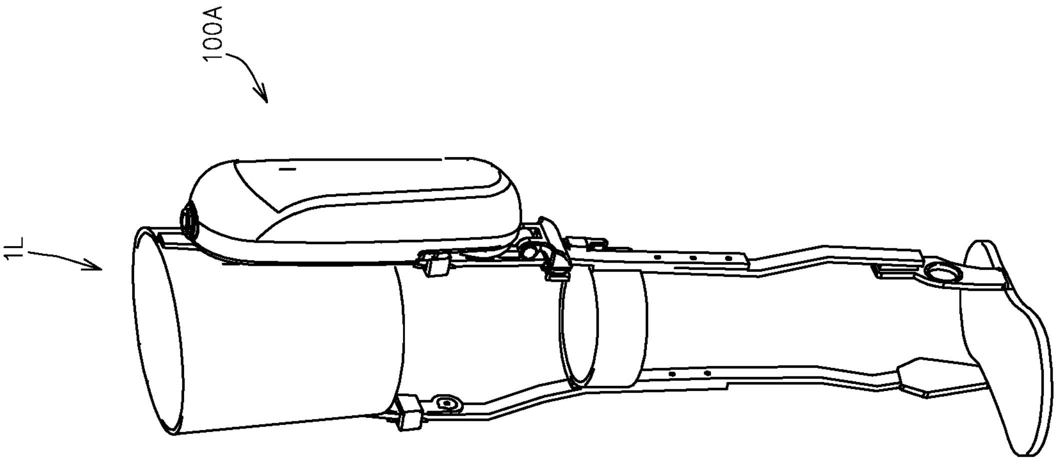
FIGS. 16A and 16B are perspective views of the gait motion assisting device attached to the knee-ankle-foot orthosis for left leg and the knee-ankle-foot orthosis for right leg, respectively.
Figure 16B:
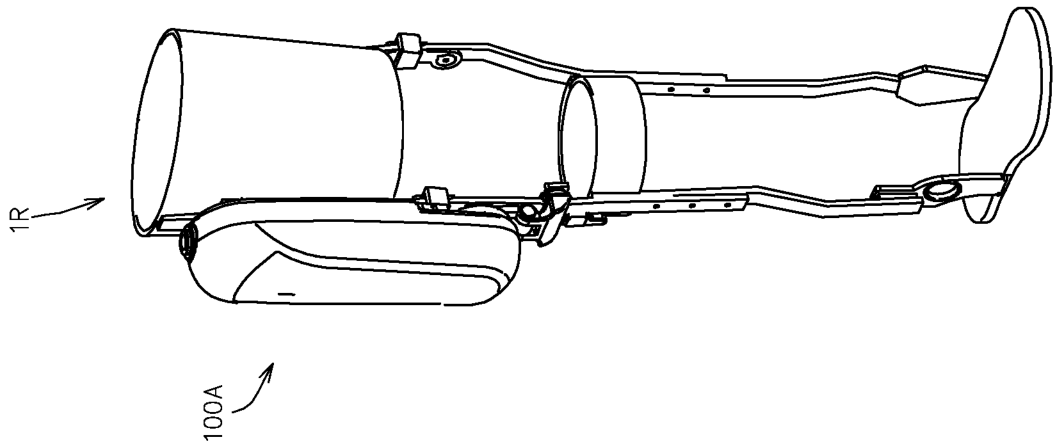

The thus configured gait motion assisting device 100A can be attached to the knee-ankle-foot orthosis for left leg when it is in a first orientation (FIG. 16A), and can be attached to the knee-ankle-foot orthosis for right leg when it is in a second orientation (FIG. 16B) that is rotated 180° around the user's trunk axis from the first orientation.

Next, the control structure of the gait motion assisting device 100A will now be described.

Figure 17:
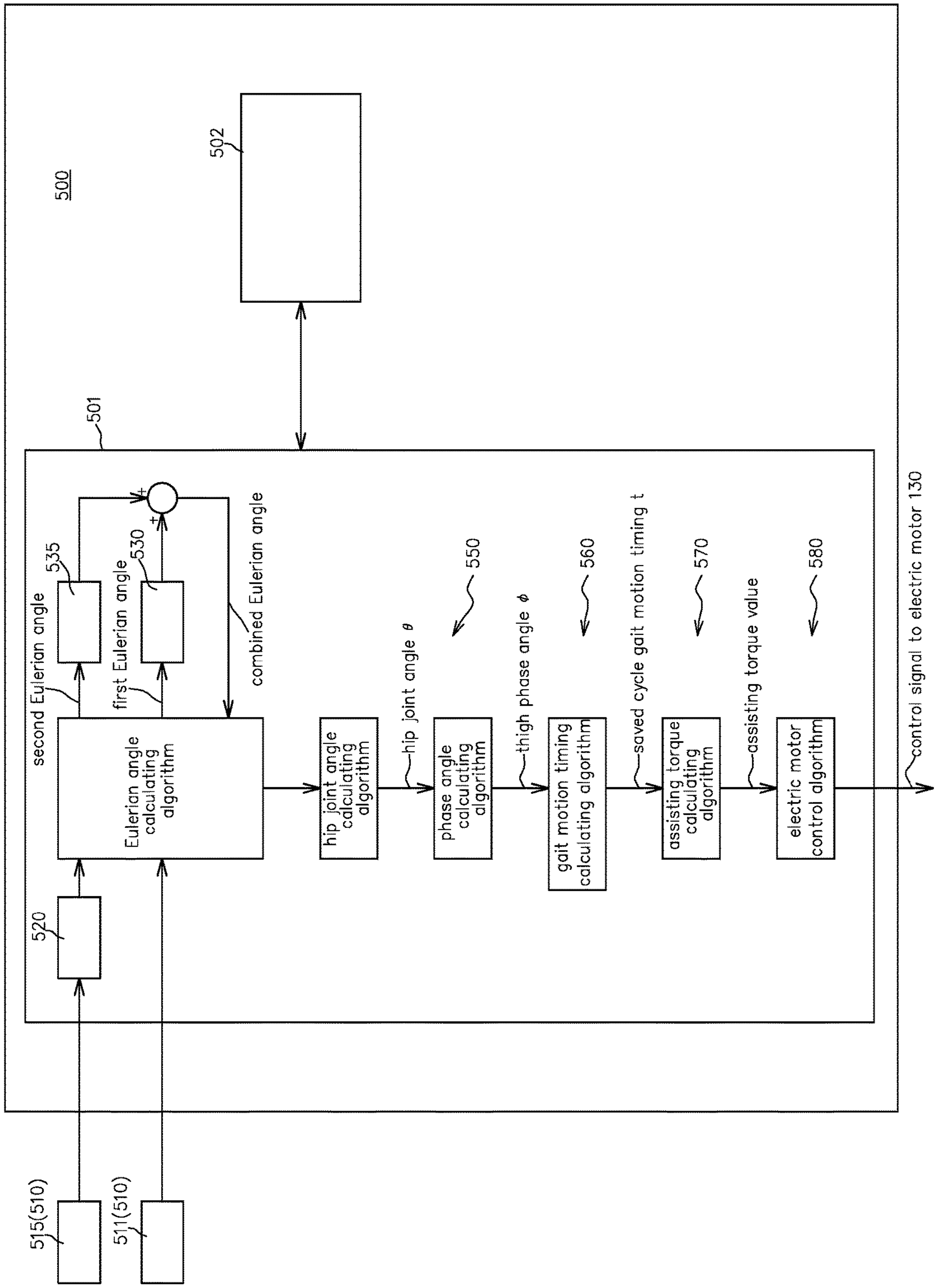
FIG. 17 is a control block diagram of the gait motion assisting device.

FIG. 17 shows a control block diagram of the gait motion assisting device 100A.

The gait motion assisting device 100A includes a thigh orientation detecting means as the gait motion state detecting sensor 170, and recognizes a gait state during gait cycle based on a thigh phase angle and performs operational control for the electric motor 130 such that gait assisting force suitable for the gait state is imparted.

That is, the gait motion assisting device 100A is configured to detect movement of not the lower leg that is a control target site but the thigh that is a site different from the lower leg, and impart gait assisting force to the lower leg that is an assisting force imparted target site based on movement of the thigh.

The thigh orientation detecting means is capable of detecting an angle-related signal relating to a hip joint angle that is the front-back swing angle of the user's thigh.

As shown in FIG. 17, the control device 500 functions as a thigh phase angle calculating means 550 that calculate a thigh phase angle based on the angle-related signal, a gait motion timing calculating means 560 that converts the thigh phase angle into a gait state (a gait motion timing) during gait cycle, an assisting torque calculating means 570 that calculate a torque value that should be output at the gait motion timing, and an electric motor control means 580 responsible for operational control for the electric motor 130.

Specifically, as shown in FIG. 17, the control device 500 has a control part 501 including a control processing means for executing processing based on a signal received from the thigh orientation detecting means 510, a manually operated member or the like; and a storage part 502 including a ROM storing a control program, control data and the like, a non-volatile storage means storing a setting value or the like such that the setting value or the like is not lost even when a power supply is interrupted and is rewritable, a RAM temporarily storing data generated during processing by the processing part or the like.

The thigh orientation detecting means 510 detects the angle-related signal at each predetermined specific sampling timing during gait cycle.

The thigh orientation detecting means 510 may have various forms such as a gyro sensor, an acceleration sensor and a rotary encoder as long as it can directly or indirectly detect the front-back swing angle of the thigh (the hip joint angle).

For example, the thigh orientation detecting means 510 can be configured to have only an acceleration sensor, and in this case, the thigh phase angle during walking can be calculated from the acceleration (or position) and speed of the acceleration sensor without calculating the hip joint angle.

In the present embodiment, the thigh orientation detecting means 510 has a triaxial angular velocity sensor (a gyro sensor) 511 capable of detecting the front-back swing angle velocity of the thigh. The thigh phase angle calculating means 550 integrates the angular velocity of the thigh detected by the triaxial angular velocity sensor 511 so that the hip joint angle, which is the front-back swing angle of the thigh, is obtained.

As shown in FIG. 17, the gait motion assisting apparatus according to the present embodiment is provided with a triaxial acceleration sensor 515, and the thigh phase angle calculating means 550 is configured to calculate the hip joint angle (the front-back swing angle of the thigh) with using the vertical axis line that the triaxial acceleration sensor 515 detects when the user is in a standstill as the reference value.

Instead, the gait motion assisting apparatus can be configured not to have the triaxial acceleration sensor 515.

In this case, the hip joint angle (the front-back swing angle of the thigh) calculated by the thigh phase angle calculating means 550 is the thigh front-back swing angle with an angle that the thigh phase angle calculating means 550 calculates when the main power source of the gait motion assisting apparatus 1 is turned on as the reference value.

Thus, in this case, the thigh phase angle calculating means 550 can correct the hip joint angle (the front-back swing angle of the thigh) by using a high-pass filter so that the median value of the hip joint angle is the reference value thereof.

Alternatively, instead of using a high pass filter, the thigh phase angle calculating means 550 can detect a deviation between the maximum value in the positive direction and the maximum value in the negative direction of a calculated hip joint angle (front-back swing angle of the thigh) and, based on the deviation, correct calculated hip joint angle so that the median value of the hip joint angle is the reference values thereof.

While it is also possible to detect the front-back swing angle of the thigh relative to the body axis line by a rotary encoder and use the detected value as a hip joint angle, in the present embodiment, the hip joint angle is calculated based on an angular velocity detected by the triaxial angular velocity sensor 511, and thereby the degree of design freedom of the gait motion assisting apparatus is increased.

That is, in a case where the hip joint angle (the thigh front-back swing angle relative to the body axis line) is detected by a rotary encoder, it is necessary to detect the angle of relative movement between a torso-side detector secured to the torso and a thigh-side detector secured to the thigh so as to swing integrally with the thigh, and it is therefore necessary to attach both detectors such that the torso-side detector and the thigh-side detector do not positionally shift relative to the torso and the thigh, respectively.

On the other hand, the method of calculating a hip joint angle based on an angular velocity detected by the triaxial angular velocity sensor 511 does not have the above-described restrictions and can provide enhanced design freedom of the gait motion assisting apparatus.

As described above, in the gait motion assisting apparatus according to the present embodiment, the thigh orientation detecting means 510 has the triaxial acceleration sensor 515 in addition to the triaxial angular velocity sensor 511.

In this case, the thigh phase angle calculating means 550 is configured to calculate a combined Eulerian angle by combining a high-frequency component of a first Eulerian angle calculated based on angular velocity data from the triaxial angular velocity sensor 511 and a low-frequency component of a second Eulerian angle calculated based on acceleration data from the triaxial acceleration sensor 515, and calculate a thigh phase angle based on a hip joint angle calculated from the combined Eulerian angle and a hip joint angular velocity calculated from the hip joint angle.

Specifically, as shown in FIG. 17, the thigh phase angle calculating means 550 receives sensor coordinate axis-based angular velocity data from the triaxial angular velocity sensor 511 at every sampling timing, and converts the angular velocity data into angular velocity data (Eulerian angular velocity) that indicates a correlation between a sensor coordinate axis and a global coordinate axis (a vertical direction-based spatial coordinate axis) using a predetermined conversion formula.

Then, the thigh phase angle calculating means 550 integrates the angular velocity data (Eulerian angular velocity) to calculate the first Eulerian angle.

Preferably, the thigh phase angle calculating means 550 can perform drift elimination on sensor coordinate axis-based angular velocity data received from the triaxial angular velocity sensor 511 at every predetermined sampling timing using angular velocity data received from the triaxial angular velocity sensor 511 when the user is in standstill (or when the user is not in motion).

Moreover, the thigh phase angle calculating means 550 receives sensor axis-based acceleration data from the triaxial acceleration sensor 515 at every sampling timing via a low-pass filter 520, and calculates the second Eulerian angle indicating a correlation between a sensor coordinate axis and a global coordinate axis (a vertical direction-based spatial coordinate axis) from the acceleration data received via the low-pass filter 520, based on acceleration data received when the user is in standstill (or when the user is not in motion) and gravitational acceleration.

Then, the thigh phase angle calculating means 550 calculates a hip joint angle θ from a unit vector indicating the orientation of the thigh and the combined Eulerian angle obtained by combining the high-frequency component of the first Eulerian angle obtained via a high-pass filter 530 and the low-frequency component of the second Eulerian angle obtained via the low-pass filter 535.

Preferably, the thigh phase angle calculating means 550 can perform drift elimination by detecting heel contact based on acceleration data from the acceleration sensor 515 and, when heel contact is detected, adding a corrected Eulerian angle calculated from angular velocity data from the triaxial angular velocity sensor 511 to the combined Eulerian angle.

A thigh phase angle φ is calculated by the following algorithm.

The thigh phase angle calculating means 550, at every sampling timing, calculates a hip joint angle θ and, also, differentiates it to calculate a hip joint angular velocity ω.

For example, the thigh phase angle calculating means 550 calculates a hip joint angle θk at the kth sampling timing Sk (k is an integer of 1 or greater) from a gait cycle reference timing, and then differentiates it to calculate a hip joint angular velocity ωk at the sampling timing Sk.

Then, the thigh phase angle calculating means 550 calculates a thigh phase angle φk (=−Arctan(ωk/θk) at the sampling timing Sk based on the hip joint angle θk and the hip joint angular velocity ωk at the sampling timing Sk.

In the gait motion assisting apparatus 100A, the thigh phase angle calculating means 550 is configured to plot, when a hip joint angle θ and a hip joint angular velocity ω are calculated based on an angle-related signal, a thigh motion state defined by the hip joint angle θ and the hip joint angular velocity ω on a phase angle plane to create a trajectory diagram.

Figure 18:
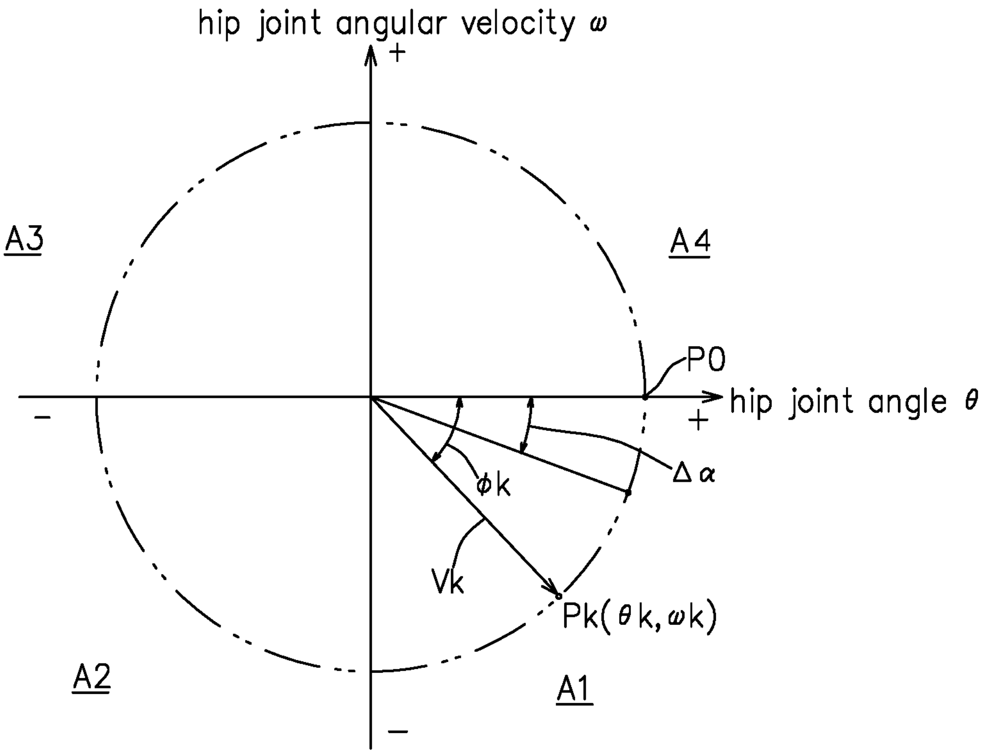
FIG. 18 is a trajectory diagram obtained by plotting hip joint angles θ and hip joint angular velocities ω over a gait cycle that a control device of the gait motion assisting device calculates.

FIG. 18 shows a trajectory diagram obtained by plotting thigh motion states (gait states) defined by the hip joint angle θ and the hip joint angular velocity ω over a gait cycle.

As shown in FIG. 18, the thigh phase angle φ determined by the hip joint angle θ and the hip joint angular velocity ω varies between 0 and 2π in a gait cycle.

Specifically, the hip joint angle in a state where the thigh is positioned in front of and behind the vertical axis line is referred to as "positive" and "negative", respectively, and the hip joint angular velocity in a state where the thigh is swung forward and backward is referred to as "positive" and "negative", respectively.

Under this condition, if the phase angle in a state where the hip joint angle is largest in the "positive" direction and the hip joint angular velocity is "zero" (point P0 in FIG. 18) is regarded as 0, a gait area A1 in FIG. 18 (a gait area from a state where the hip joint angle θ is largest in the "positive" direction and the hip joint angular velocity ω is "zero" to a state where the hip joint angle θ is "zero" and the hip joint angular velocity ω is largest in the "negative" direction) corresponds to the phase angle of 0 to π/2.

Also, a gait area A2 in FIG. 18 (a gait area from a state where the hip joint angle θ is "zero" and the hip joint angular velocity is largest in the "negative" direction to a state where the hip joint angle is largest in the "negative" direction and the hip joint angular velocity is "zero") corresponds to the phase angle of π/2 to π.

Moreover, a gait area A3 in FIG. 18 (a gait area from a state where the hip joint angle θ is largest in the "negative" direction and the hip joint angular velocity ω is "zero" to a state where the hip joint angle θ is "zero" and the hip joint angular velocity ω is largest in the "positive" direction) corresponds to the phase angle of π to 3π/2.

Also, a gait area A4 in FIG. 18 (a gait area from a state where the hip joint angle θ is "zero" and the hip joint angular velocity is largest in the "positive" direction to a state where the hip joint angle is largest in the "positive" direction and the hip joint angular velocity is "zero") corresponds to the phase angle of 3π/2 to 2π.

The sampling timing of the thigh orientation detecting means 510 is determined such that a plurality of sampling timings are included in a gait cycle, and the thigh phase angle calculating means 550 calculates the thigh phase angle φ at each sampling timing.

In the present embodiment, the thigh phase angle calculating means 550 determines whether the vector length of a plot point Pk (the distance between the origin of the trajectory diagram (i.e., the point where the hip joint angle θ and the hip joint angular velocity ω are zero) and the plot point Pk) defined by the hip joint angle θk and the hip joint angular velocity ωk on the trajectory diagram exceeds a predetermined threshold value and, when the vector length exceeds the predetermined threshold value, calculates a thigh phase angle φk that is based on the hip joint angle θk and the hip joint angular velocity ω k, and sends the thigh phase angle φk to the gait motion timing calculating means 560.

On the other hand, when the vector length is less than or equal to the predetermined threshold value, the thigh phase angle calculating means 550 outputs an actuator operation inhibitory signal.

This configuration enables the gait motion assisting apparatus 100A to be effectively prevented from being operated when gait motion is not started.

That is, a user wearing the gait motion assisting apparatus 100A may unintentionally change posture over a small range before starting gait motion. In particular, in the case of a user with hemiplegia or the like, such a situation likely arises.

When the thigh phase angle calculating means 550 has the above configuration, such a minor posture change is detected as a vector having a short vector length.

Accordingly, by determining that gait motion is being performed only when the vector length of the vector Vk (see FIG. 18) defined by the hip joint angle θk and the hip joint angular velocity ωk exceeds a predetermined threshold value, the actuator unit 100 can be effectively prevented from being unintentionally operated when gait motion is not started.

The gait motion timing calculating means 560 has a phase pattern function that defines a relationship between a thigh phase angle φ and a gait motion timing during gait cycle, and applies the thigh phase angle φ at a sampling timing sent from the thigh phase angle calculating means 550 to the phase pattern function to calculate which gait motion timing during gait cycle said the sampling timing corresponds to (which timing the sampling timing of the thigh phase angle φ corresponds to, when a gait cycle is 100%).

Moreover, the gait motion timing calculating means 560, every time a gait cycle is completed, calculates the latest phase pattern function by performing the least-squares method on effective phase angle data including past phase angle data stored at that time and the latest phase angle data in which the thigh phase angle φ in the completed gait cycle and the gait motion timing corresponding to the thigh phase angle φ are associated with each other, and overwrite-saves the calculated latest phase pattern function.

Figure 19:
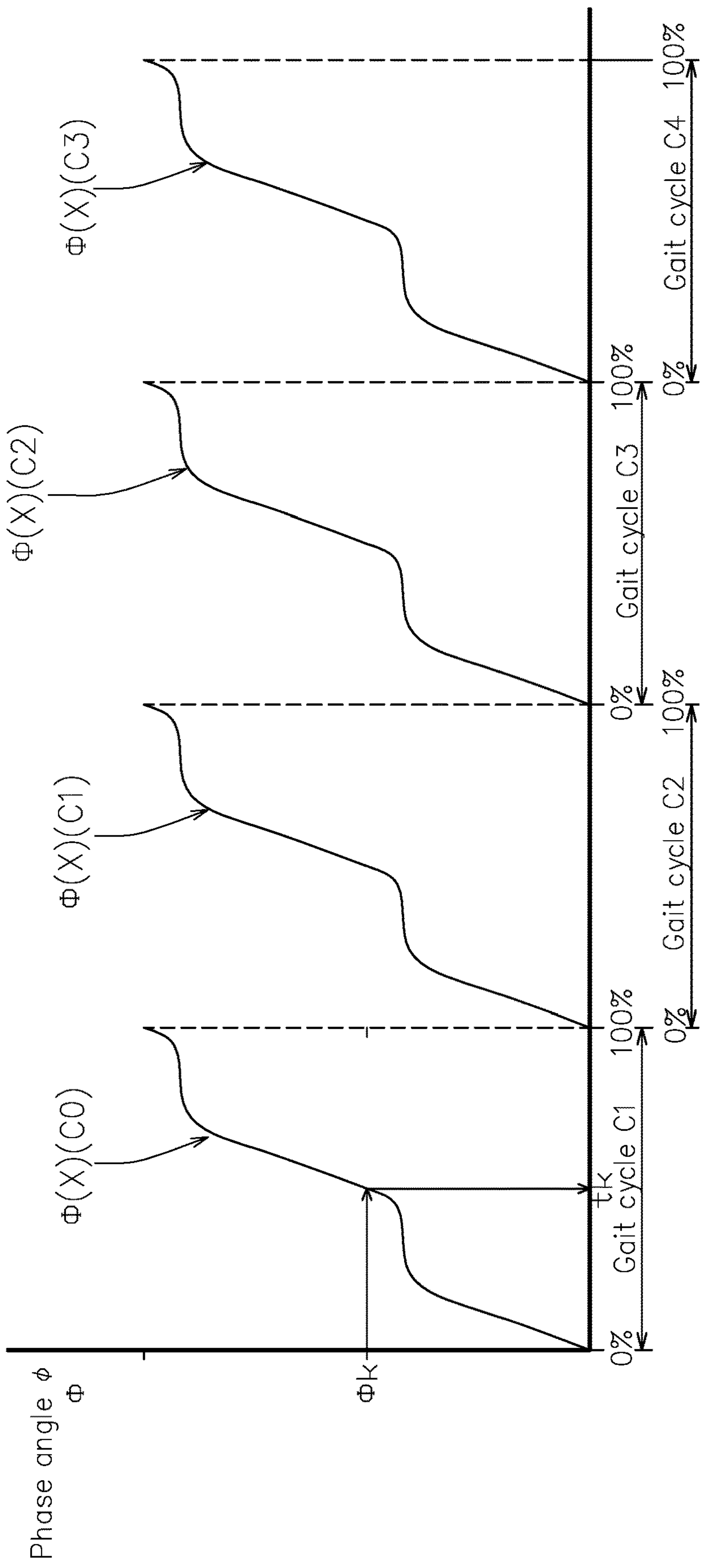
FIG. 19 is a graph of a phase pattern function showing a relationship between a thigh phase angle φ and a gait motion timing during gait cycle.

Specifically, as shown in FIG. 19, an initial phase pattern function φ(x)(C0) is stored as the phase pattern function in the gait motion timing calculating means 560 in an initial state.

This initial phase pattern function φ(x)(C0) is created for each user and stored in the gait motion timing calculating means 560 in advance.

For example, during a first gait cycle C1, the thigh phase angle calculating means 550 calculates φk as a thigh phase angle at a sampling timing Sk and sends it to the gait motion timing calculating means 560.

At this time, the first gait cycle C1 is not yet completed, and thus the gait motion timing calculating means 560 has the initial phase pattern function φ(x)(C0) as the phase pattern function.

Accordingly, the gait motion timing calculating means 560, as shown in FIG. 19, applies the thigh phase angle φk sent from the thigh phase angle calculating means 550 to the initial phase pattern function φ(x)(C0) to calculate a saved cycle gait motion timing tk corresponding to the sampling timing Sk, and sends it to the assisting torque calculating means 570.

The gait motion timing calculating means 560 repeats this processing until the first gait cycle C1 is completed.

Completion of a gait cycle can be determined, for example, based on whether the thigh phase angle φ defined by the hip joint angle θ and the hip joint angular velocity ω has returned to a preset gait cycle reference angle.

The gait motion timing calculating means 560, when the first gait cycle C1 is completed, adds the latest phase angle data in which a thigh phase angle received from the thigh phase angle calculating means 550 during the completed first gait cycle C1 and a gait motion timing corresponding to the thigh phase angle are associated with each other to past phase angle data stored at that time (in this example, phase angle data created by the initial phase pattern function φ(x)(C0)), creates effective phase angle data that is effective at that time, calculates the latest phase angle pattern function (in this example, a phase pattern function upon first gait cycle completion φ(x)(C1)) by performing the least-squares method on the effective phase angle data, and overwrite-saves the latest phase angle pattern function.

Specifically, when the first gait cycle C1 is completed, the gait motion timing calculating means 560 performs the least-squares method on the effective phase angle data that is effective at that time to calculate the coefficient parameter of:

$$\varphi(x)(C1) = a_0(1) + a_1(1)x + a_2(1)x^2 + \ldots + a_m(1)x^m$$

and save φ(x)(C1) as a phase pattern function of the thigh phase angle. In the above formula, m is a positive integer.

Then, in the second gait cycle C2, the gait motion timing calculating means 560 uses the phase pattern function upon first gait cycle completion φ(x)(C1) stored at that time to calculate a saved cycle gait motion timing tk.

When the second gait cycle C2 is completed, the gait motion timing calculating means 560 performs the least-squares method on the effective phase angle data that is effective at that time to calculate the coefficient parameter of:

$$\varphi(x)(C2) = a_0(2) + a_2(2)c + a_2(2)x^2 + \ldots + a_m(2)x^m$$

and overwrite-save φ(x)(C2) as a phase pattern function of the thigh phase angle.

Then, in the third gait cycle C3, the gait motion timing calculating means 560 uses the phase pattern function upon second gait cycle completion φ(x)(C2) stored at that time to calculate a saved cycle gait motion timing.

The gait motion timing calculating means 560 repeats this processing.

The effective phase angle data may include the phase angle data of all gait cycles that have been completed by that time and, alternatively, depending on the storage capacity of the gait motion timing calculating means 560, may be limited to only the phase angle data of the latest gait cycles (such as 100 gait cycles).

In the present embodiment, having the following configuration, the gait motion timing calculating means 560 prevents abnormal phase angle data from being included in the effective phase angle data at the time of calculating a phase angle pattern function.

That is, the gait motion timing calculating means 560 calculates a difference ΔT between a current cycle gait motion timing Tk calculated based on a thigh phase angle φk at a sampling timing Sk received from the thigh phase angle calculating means 550 and a saved cycle gait motion timing tk calculated by applying the thigh phase angle φk to the phase pattern function φ(x) stored at that time.

Here, the current cycle gait motion timing Tk is calculated by:

$$Tk = (\varphi k/2\pi) \times 100\,(\%)$$

When the absolute value of the difference ΔT is less than or equal to a predetermined threshold value, the gait motion timing calculating means 560 stores the current cycle gait motion timing Tk as effective phase angle data to be used when calculating a new phase pattern function φ(x) upon completion of a gait cycle.

That is, when the absolute value of the difference ΔT is less than or equal to a predetermined threshold value, the gait motion timing calculating means 560 when calculating the latest phase pattern function upon completion of a gait cycle stores the current cycle gait motion timing Tk as a gait motion timing to be associated with a thigh phase angle φ received from the thigh phase angle calculating means 550 in the gait cycle.

On the other hand, when the absolute value of the difference ΔT exceeds a predetermined threshold value, the gait motion timing calculating means 560 stores the saved cycle gait motion timing tk as effective phase angle data to be used when calculating the latest phase pattern function upon completion of a gait cycle.

That is, when the absolute value of the difference ΔT exceeds a predetermined threshold value, the gait motion timing calculating means 560 when calculating the latest phase pattern function upon completion of a gait cycle stores the saved cycle gait motion timing tk as a gait motion timing to be associated with a thigh phase angle φ received from the thigh phase angle calculating means 550 in the gait cycle.

This configuration enables a current cycle gait motion timing Tk that has become an abnormal value for some reason to be effectively prevented from being included in the target data (effective phase angle data) at the time of calculating a phase pattern function.

The assisting torque calculating means 570 applies a gait motion timing tk sent from the gait motion timing calculating means 560 to output pattern saved data that is saved in the control device 500 and that defines a relationship between a gait motion timing during gait cycle and a torque value to be output, to calculate a torque value that should be output at the sampling timing Sk.

As described above, the gait motion assisting apparatus 100A according to the present embodiment can be attached to both the knee-ankle-foot orthosis for left leg 1L and the knee-ankle-foot orthosis for right leg 1R.

Accordingly, the control device 500 includes, as the assisting force control data, a left-leg assisting force control data and a right-leg assisting force control data respectively used when the gait motion assisting apparatus 100A is attached to the knee-ankle-foot orthosis for left leg 1L and the knee-ankle-foot orthosis for right leg 1R.

A method for selecting the left-leg assisting force control data and the right-leg assisting force control data will be described below.

The driver control means 580 executes operational control for the driver such that assisting force having a torque value calculated by the assisting torque calculating means 570 is output.

Thus, the gait motion assisting apparatus 100A is configured such that a gait state (a gait motion timing) during gait cycle is calculated based on a thigh phase angle φ, and assisting force corresponding to the gait state is output.

Accordingly, assisting force suitable for a gait state during gait cycle can be output.

Also, the gait motion assisting apparatus 100A is configured to apply the thigh phase angle φ at a sampling timing to the phase pattern function stored at that time to calculate a gait state (a gait motion timing) at the sampling timing.

Accordingly, even when irregular gait motion is performed during a gait cycle, corrected assisting force can be output.

In the gait motion assisting apparatus 100A, the thigh phase angle calculating means 550, only when the vector length of a plot point on a trajectory diagram defined by the hip joint angle θ and the hip joint angular velocity ω exceeds a predetermined threshold value, calculates a thigh phase angle φ that is based on the hip joint angle θ and the hip joint angular velocity ω and sends the thigh phase angle φ to the gait motion timing calculating means and, on the other hand, when the vector length is less than or equal to the predetermined threshold, outputs an actuator operation inhibitory signal.

Accordingly, in the case where a user wearing the gait motion assisting apparatus 100A unintentionally changes posture, t the gait motion assisting apparatus 100A can be effectively prevented from outputting gait assisting force even when gait motion is not started.

Moreover, the gait motion assisting apparatus 100A, as described above, is configured to recognize a gait state (a gait motion timing) during gait cycle based on the thigh phase angle φ and then impart gait assisting force to the lower leg by the driver.

Accordingly, suitable gait assisting force can be supplied also to a user with hemiplegia due to a stroke or the like.

That is, conventional gait motion assisting apparatus configured to impart gait assisting force by a driver such as an electric motor are configured to detect movement of a control target site itself to which assisting force is to be imparted by the driver, and perform operational control for the driver based on the detection result.

For example, in conventional gait motion assisting apparatuses that supply gait assisting force to the thigh, operational control for a driver that imparts gait assisting force to the thigh is performed based on the result of detecting thigh movement.

Also, in conventional gait motion assisting apparatuses that supply gait assisting force to the lower leg, operational control for a driver that imparts gait assisting force to the lower leg is performed based on the result of detecting lower leg movement.

However, in the case of a patient with hemiplegia due to a stroke or the like, gait motion of the lower leg (forward and backward swing motion around the knee joint) often cannot be performed normally, while gait motion of the thigh (forward and backward swing motion around the hip joint) can be performed relatively normally.

When attempting to impart gait assisting force to the lower leg of such a patient, in the above conventional gait motion assisting apparatuses, operational control for a driver that provides gait assisting force to the lower leg is performed based on the movement of the lower leg that is incapable of normal gait motion and, possibly, suitable gait assisting force cannot be provided.

On the other hand, the gait motion assisting apparatus 100A according to the present embodiment is configured to perform operational control for the electric motor 130 that imparts gait assisting force to the lower leg based on the thigh phase angle φ as described above.

Accordingly, even in the case of a user with hemiplegia due to a stroke or the like, suitable gait assisting force can be supplied to the lower leg.

Next, the method for selecting the left-leg assisting force control data and the right-leg assisting force control data will now be described.

In the present embodiment, the control device 500 is configured to recognize as a reference value a detection signal that is input from the rotation sensor 160 when the first lower-leg frame 40(1) is positioned at the forward swinging end around the brace-side pivot axis X (i.e., when the lower leg is fully extended), recognize swingable directions of the first lower-leg frame 40(1) based on a detection signal that is input from the rotation sensor 160 and that is different from the reference value, and, accordingly, automatically select the assisting force control data to be used among the left-leg assisting force control data and the right-leg assisting force control data.

The gait motion assisting apparatus 100A having this configuration is capable of effectively preventing a situation where the left or right-leg assisting force control data used when the control device 500 calculates assisting force does not match the left or right leg to which the apparatus is attached, and is thus capable of providing appropriate gait assisting force.

In the present embodiment, an absolute rotary encoder is used as the rotation sensor 160.

Concerning the absolute rotary encoder, a position corresponding to the reference value is set as a zero-point position.

Alternatively, an incremental rotary encoder is also usable as the rotation sensor 160.

In one form (a first form) of the configuration in which the incremental rotary encoder is provided as the rotation sensor 160 (hereinafter referred to as an incremental rotary encoder configuration), the gait motion assisting apparatus 100A is provided with a manually operable reference switch.

In this case, the control device 500 is configured to recognize as the reference value a detection signal that is input from the rotation sensor 160 when the reference switch is ON.

In another form (a second form) of the incremental rotary encoder configuration, the control device 500 is configured to calculate angular acceleration of the drive arm 150 around the drive-side pivot axis Y based on a detection signal that is input from the rotation sensor 160 (the incremental rotary encoder), recognize a position of the first lower-leg frame 40(1) at the time when the angular acceleration exceeds a predetermined threshold value as a fully extended position of the first lower-leg frame 40(1), and recognize as the reference value a detection signal of the rotation sensor 160 that is input at that time.

Specifically, as described above, when the lower leg is fully extended, an upper-end inclined surface 45 (see FIG. 3) of the first lower-leg frame 40(1) is brought into contact with a lower-end inclined surface 25 (see FIG. 3) of the first thigh frame 20(1), and thus the first lower-leg frame 40(1) is prohibited from swinging further forward relative to the first thigh frame 20(1).

Here, in view of the rate of change in angular velocity (angular acceleration) of the drive arm 150 that swings together with the first lower-leg frame 40(1), it is considered that when the lower leg is extended from a state of being bent relative to the thigh and reaches a fully extended state, the angular velocity of the drive arm 150 momentarily becomes zero, and, at that time, the rate of change in angular velocity (angular acceleration) of the drive arm 150 becomes the largest.

Accordingly, the time when the lower leg is fully extended can be detected by setting the predetermined threshold value to be smaller than the angular acceleration of the drive arm 150 attained when the lower leg is fully extended and greater than the angular velocity of the drive arm 150 attained when the lower leg is not fully extended.

This predetermined threshold value can be obtained by conducting an actual gait experiment for each user.

In yet another form (a third form) of the incremental rotary encoder configuration, the gait motion assisting apparatus 100A includes a fully extended position detection sensor for directly or indirectly detecting that the first lower-leg frame 40(1) is in a fully extended position.

The fully extended position detection sensor may be, for example, a microswitch or a distance sensor that detects whether or not the drive arm 150 is positioned in a place where the drive arm 150 should be positioned when the lower leg is fully extended.

In this case, the control device 500 is configured to recognize as the reference value a detection signal that is input from the rotation sensor 160 when the fully extended position detection sensor detects an arrival of the drive arm 150 in the fully extended position.

In the present embodiment, the control device 500 is configured to select the assisting force control data to be used among the left-leg assisting force control data and the right-leg assisting force control data based on a first detection signal, other than the reference value, input from the rotation sensor 160 after the main power source of the gait motion assisting apparatus 100A is switched ON from OFF.

The gait motion assisting apparatus 100A according to the present embodiment is configured such that the control device 500 automatically selects the assisting force control data to be used among the left-leg assisting force control data and the right-leg assisting force control data, but, alternatively, the gait motion assisting apparatus 100A may be modified such that the assisting force control data is manually selected, and a user is notified of an error when the manual operation is erroneous.

Compared with the gait motion assisting apparatus 100A, this modification example further includes a manually operable left-leg and right-leg selector switch and a notification means such as a lamp or an alarm for notifying a user of an error.

In the modification example, the control device 500 is configured so as to determine the assisting force control data to be used among the left-leg assisting force control data and the right-leg assisting force control data based on a detection signal that is input from the rotation sensor 160 and that is different from the reference value, and, when the assisting force control data determined to be used is different from the assisting force control data manually selected through the left-leg and right-leg selector switch, notify the user of an error via the notification means.

In the modification example, preferably the control device 500 may be configured so as to suspend operation of the electric motor 130 in addition to notifying of an error by the notification means when the assisting force control data determined to be used based on a signal from the rotation sensor 160 is different from the assisting force control data selected by manual operation.

Alternatively, the control device 500 may be configured such that when the assisting force control data determined to be used based on a signal from the rotation sensor 160 is different from the assisting force control data selected by manual operation, the control device 500, in addition to notifying of an error by the notification means, employs the assisting force control data determined to be used based on a signal from the rotation sensor 160 in place of the assisting force control data selected by manual operation, applies the calculated gait motion timing to the assisting force control data to calculate the direction and the size of assisting force to be imparted to the first lower-leg frame 40(1), and performs operational control for the electric motor 130 such that assisting force having the calculated direction and size can be obtained.

Second Embodiment

Below, another embodiment of the gait motion assisting apparatus according to the present invention will now be described with reference to the attached drawings.

Figure 20:
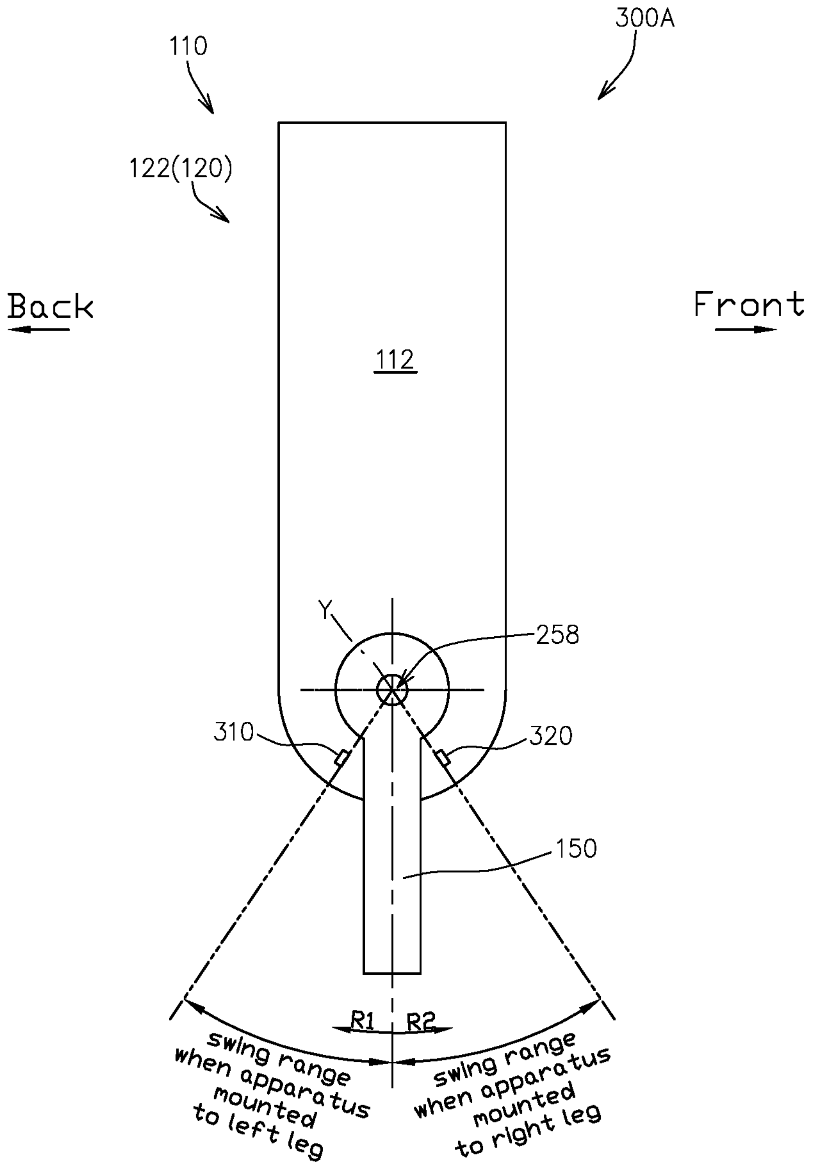
FIG. 20 is a schematic side view of a gait motion assisting apparatus according to a second embodiment of the present invention, and shows a first orientation of the gait motion assisting apparatus for attachment to the knee ankle foot orthosis for left leg as viewed from the inner side in the user width direction.

FIG. 20 is a schematic side view of a gait motion assisting apparatus 300A according to the present embodiment that is in a first orientation for attachment to a left-leg knee ankle foot orthosis 1L as viewed from the inner side in the user width direction.

In the drawing, the same components as those in the above first embodiment are given the same reference numbers.

The gait motion assisting apparatus 100A according to the first embodiment is configured so as to select the assisting force control data to be used among the left-leg assisting force control data and the right-leg assisting force control data based on a detection result of the rotation sensor 160.

On the other hand, the gait motion assisting apparatus 300A according to the present embodiment includes a rotational direction detecting mechanism, and the control device 500 is configured so as to select the assisting force control data to be used among the left-leg assisting force control data and the right-leg assisting force control data based on a detection result of the rotational direction detecting mechanism.

The rotational direction detecting mechanism has first and second rotation sensors 310, 320 for respectively detecting that the drive arm 150 is rotated from a reference position in a first direction R1 toward one side and in a second direction R2 toward the other side around the drive-side pivot axis Y, with the swinging position around the drive-side pivot axis Y where the drive arm 150 arrives when the lower-leg frame 40 is positioned at the forward swinging end around the brace-side pivot axis X (i.e., when the lower leg is fully extended) being regarded as the reference position.

The first and second rotation sensors 310, 320 may be, for example, microswitches or distance sensors.

The gait motion assisting apparatus 300A according to the present embodiment having this configuration is also capable of providing the same effect as the effect in the first embodiment.

The rotational direction detecting mechanism is configured so as to detect the rotational direction of the drive arm 150 by two sensors, i.e., the first and second rotation sensors 310, 320.

Alternatively, it can also be configured so as to detect the rotational direction of the drive arm by a rotational direction detecting mechanism having a single sensor.

Figure 21:
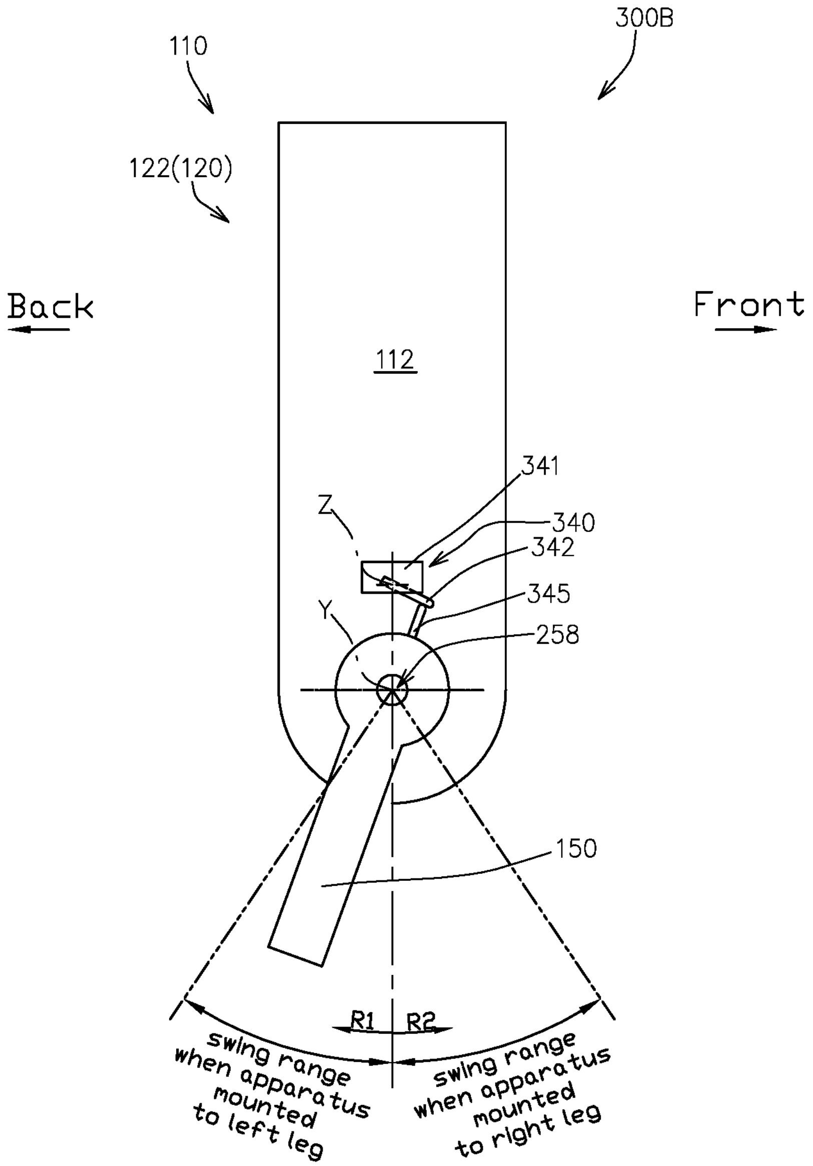
FIG. 21 is a schematic side view of a gait motion assisting apparatus according to a first modification of the second embodiment, and shows a first orientation of the gait motion assisting apparatus for attachment to the knee ankle foot orthosis for left leg as viewed from the inner side in the user width direction.

FIG. 21 is a schematic side view of a gait motion assisting apparatus 300B including a rotational direction detecting mechanism having a single sensor according to a first modification example of the present embodiment, wherein the gait motion assisting apparatus 300B is in the first orientation for attachment to the left-leg knee ankle foot orthosis 1L as viewed from the inner side in the user width direction.

In the drawing, the same components as those in the first and second embodiments are given the same reference numbers.

As shown in FIG. 21, in the first modification example 300B, the rotational direction detecting mechanism has an interlocking arm 345 that is rotated around the drive-side pivot axis Y together with the drive arm 150, and a toggle switch type rotation sensor 340.

The interlocking arm 345 extends radially outward from the proximal end part of the drive arm 150.

The rotation sensor 340 has a detection-target arm 342 capable of rotation around a sensor axis Z parallel to the drive-side pivot axis Y, and a sensor body 341 for detecting the rotational direction of the detection-target arm 342 around the sensor axis Z.

The detection-target arm 342 is engaged with the distal end part of the interlocking arm 345 so as to be rotated around the sensor axis Z in accordance with the rotation of the interlocking arm 345 around the drive-side pivot axis Y.

The first modification example having this configuration is also capable of providing the same effect as the effect in the present embodiment.

Figure 22:
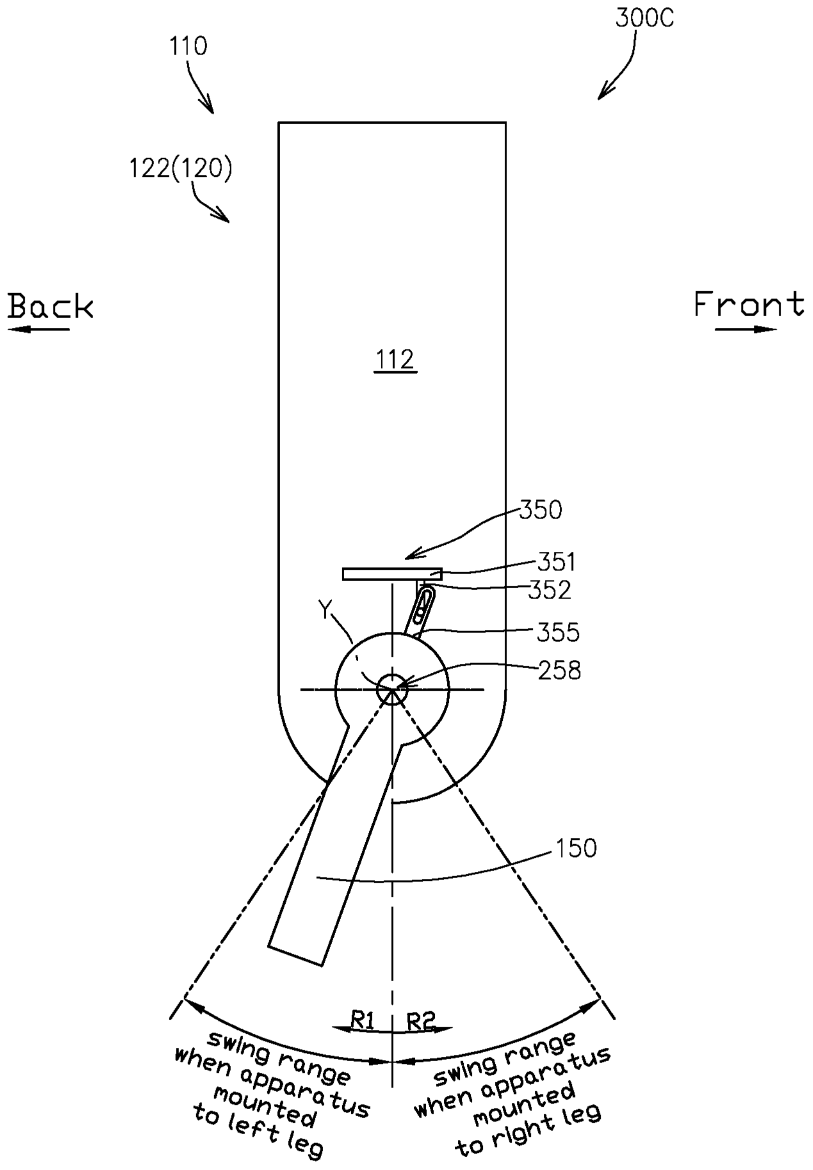
FIG. 22 is a schematic side view of a gait motion assisting apparatus according to a second modification of the second embodiment, and shows a first orientation of the gait motion assisting apparatus for attachment to the knee ankle foot orthosis for left leg as viewed from the inner side in the user width direction.

FIG. 22 is a schematic side view of a gait motion assisting apparatus 300C including a rotational direction detecting mechanism having a single sensor according to a second modification example, wherein the gait motion assisting apparatus 300C is in the first orientation for attachment to the left-leg knee ankle foot orthosis 1L as viewed from the inner side in the user width direction.

In the drawing, the same components as those in the first and second embodiments are given the same reference numbers.

As shown in FIG. 22, in the second modification example 300C, the rotational direction detecting mechanism has an interlocking arm 355 that is rotated around the drive-side pivot axis Y together with the drive arm 150, and a slide switch type or slide variable resistance type sensor 350.

The interlocking arm 355 extends radially outward from the proximal end part of the drive arm 150.

The interlocking arm 355 includes a slot in the longitudinal direction of the interlocking arm 355.

The sensor 350 has a detection-target arm 352 having a proximal end part that is supported so as to be movable in the front-back direction of a user when the gait motion assisting apparatus 300C is attached, and a sensor body 351 for detecting the direction of movement of the detection-target arm 352.

The distal end part of the detection-target arm 352 has an engagement pin for insertion into the slot. When the interlocking arm 355 is rotated around the drive-side pivot axis Y together with the drive arm 150, the engagement pin inserted into the slot is pressed in a direction corresponding to the rotational direction of the interlocking arm 355, and, accordingly, the detection-target arm 352 slides in the corresponding direction.

The sensor body 351 is a slide switch or a variable resistance sensor, and detects the slide direction of the detection-target arm 352.

The second modification example having this configuration is also capable of providing the same effect as the effect in the present embodiment.

Figure 23:
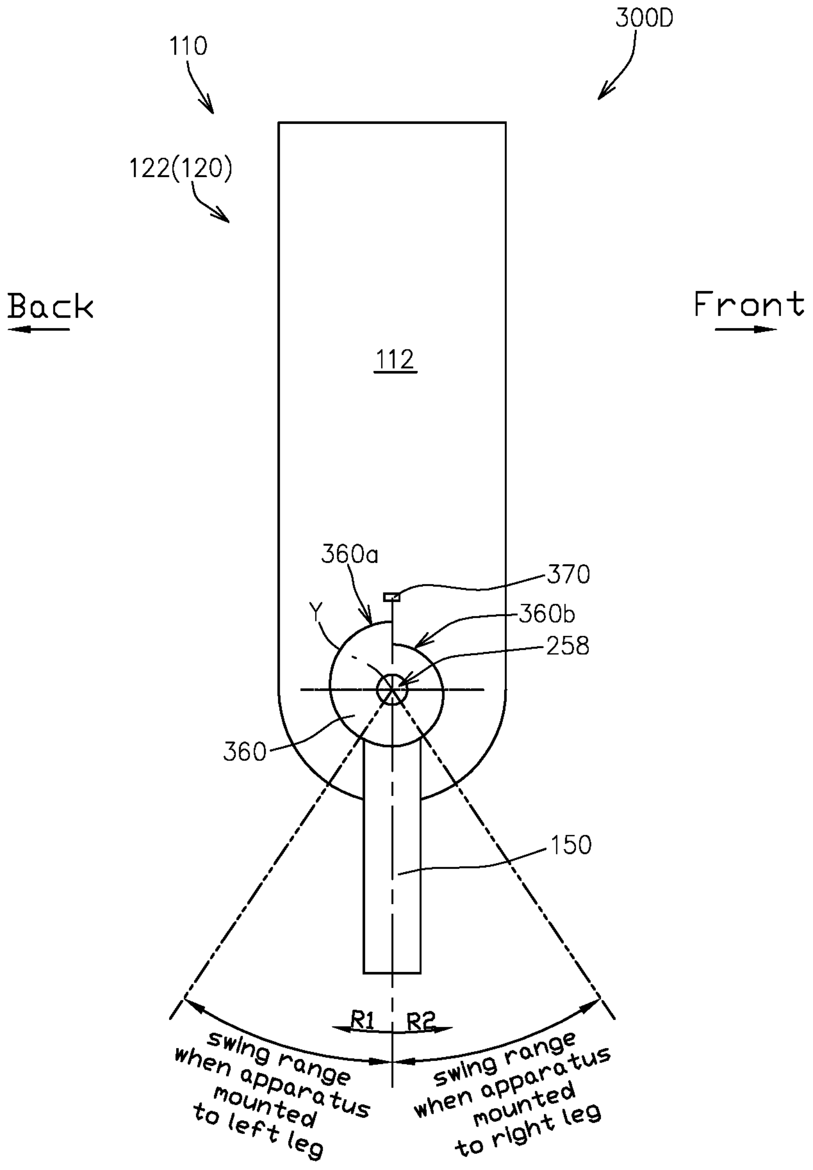
FIG. 23 is a schematic side view of a gait motion assisting apparatus according to a third modification of the second embodiment, and shows a first orientation of the gait motion assisting apparatus for attachment to the knee ankle foot orthosis for left leg as viewed from the inner side in the user width direction.

FIG. 23 is a schematic side view of a gait motion assisting apparatus 300D according to the third modification example of the present embodiment that is in a first orientation for attachment to the left-leg knee ankle foot orthosis 1L as viewed from the inner side in the user width direction.

In the drawing, the same components as those in the first and second embodiments are given the same reference numbers.

Compared with the gait motion assisting apparatus 300A, the gait motion assisting apparatus 300D according to the third modification example has a rotational direction detecting mechanism in place of the aforementioned rotational direction detecting mechanism.

As shown in FIG. 23, the rotational direction detecting mechanism has a detection target 360 that is rotated around the drive-side pivot axis Y together with the drive arm 150, and a distance sensor 370 for detecting the distance between the distance sensor 370 and the detection target 360.

The detection target 360 includes a first region 360*a* positioned in a detection region when the drive arm 150 is rotated from the reference position in the first direction R1 around the drive-side pivot axis Y, and a second region 360*b* positioned in the detection region when the drive arm 150 is rotated from the reference position in the second direction R2 around the drive-side pivot axis Y, and the distances of the first and second regions 360*a*, 360*b* away from the distance sensor 370 are different.

The third modification example 300D is configured such that the first and second regions are provided so as to have different distances from the distance sensor 370, and the rotational direction of the drive arm 150 is recognized by utilizing the difference between the distances of the distance sensor 370 to the first and second regions.

Alternatively, the rotational direction of the drive arm 150 can also be recognized by giving a first color (including hue and shade), a first slit pattern or a first barcode pattern to the first region positioned in the detection region when the drive arm 150 is rotated from the reference position in the first direction around the drive-side pivot axis Y, giving a second color (including hue and shade), a second slit pattern or a second barcode pattern to the second region positioned in the detection region when the drive arm 150 is rotated from the reference position in the second direction around the drive-side pivot axis Y, and detecting the difference between the colors, slit patterns or barcode patterns by a sensor.

Third Embodiment

Below, yet another embodiment of the gait motion assisting apparatus according to the present invention will now be described.

Compared with the gait motion assisting apparatus 100A according to the first embodiment, the gait motion assisting apparatus according to the present embodiment has a thigh gyro sensor for detecting the thigh swinging angle of a user as the gait motion state detecting sensor 170 and also has a lower-leg gyro sensor for detecting the lower-leg swinging angle of the user in place of the rotation sensor 160.

In the present embodiment, the control device 500 is configured so as to calculate a knee joint angle, which is the rotational angle of the lower leg relative to the thigh, based on the thigh swinging angle from the thigh gyro sensor and the lower-leg swinging angle from the lower-leg gyro sensor, determine whether the leg of the user currently wearing the gait motion assisting apparatus is the left leg or the right leg based on the knee joint angle at the time when the calculated knee joint angle is different from the knee joint angle attained when the lower leg is fully extended, and, based on this determination, select the assisting force control data to be used among the left-leg assisting force control data and the right-leg assisting force control data.

The gait motion assisting apparatus according to the present embodiment having this configuration is also capable of providing the same effect as the effect in the first and second embodiments.

Naturally, in the second embodiment and the third embodiment as well, the control device 500 can be configured so as to select the assisting force control data to be used by manual operation in place of automatically selecting the assisting force control data to be used among the left-leg assisting force control data and the right-leg assisting force control data, and the control device 500 can also be configured so as to notify the user of an error and, moreover, suspend operation of the electric motor 130 when the assisting force control data selected by manual operation is different from the assisting force control data determined to be used based on a detection result by the rotational direction detecting mechanism or a knee joint angle calculated by utilizing signals from the gyro sensors.

Alternatively, the control device 500 can also be configured so as to, in addition to notifying the user of an error, employ the assisting force control data determined to be used based on a detection result by the rotational direction detecting mechanism or a knee joint angle calculated by utilizing signals from the gyro sensors in place of the assisting force control data selected by manual operation, apply the calculated gait motion timing to the employed assisting force control data to calculate the direction and the size of assisting force to be imparted to the first lower-leg frame 40(1), and perform operational control for the electric motor 130 such that assisting force having the calculated direction and size can be obtained.

DESCRIPTION OF THE REFERENCE NUMERALS

1L, 1R knee-ankle-foot orthoses for left leg and right leg
11 thigh attachment
20(1), 20(2) first and second thigh frames
31 lower leg attachment
40(1), 40(2) first and second lower leg frames
100A, 300A-300D gait motion assisting apparatus
110 casing
112 mounting surface
130 electric motor
150 drive arm
160 rotation angle sensor
170 gait motion state detecting sensor
310, 320 first and second rotation sensors
360 detection target
360*a*, 360*b* first and second regions
370 distance sensor
500 control device
X brace-side pivot axis line
Y actuator-side pivot axis line

The invention claimed is:

1. A gait motion assisting apparatus applicable to a knee ankle foot orthosis, wherein the knee ankle foot orthosis comprises a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, and wherein the gait motion assisting apparatus comprises:

a casing having:

a first orientation that is a connectable orientation wherein an attachment surface faces the knee ankle foot orthosis and a drive-side pivot axis is positioned coaxially with the brace-side pivot axis when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg;

an electric motor accommodated in the casing and capable of outputting rotational power in both a first direction toward one side and a second direction toward the other side around an axis from an output shaft;

a drive arm comprising a proximal end part and a distal end part, wherein:

the proximal end part is operatively connected to the output shaft so as to swing in the first direction toward one side and the second direction toward the other side around the drive-side pivot axis in accordance with an output of the output shaft in the first and second directions, respectively, and the drive arm is configured so that when the casing is connected to the knee ankle foot orthosis, the distal end part is directly or indirectly connected to the lower-leg frame so as to press the lower-leg frame around the brace-side pivot axis in accordance with the swing around the drive-side pivot axis;

a rotation sensor capable of detecting a swinging position of the drive arm around the drive-side pivot axis;

a gait motion state detection sensor for detecting a gait motion state during a gait cycle; and a control device having assisting force control data used when:

calculating a direction and a size of assisting force to be imparted to the lower-leg frame, wherein the assisting force control data includes left-leg assisting force control data and right-leg assisting force control data, the left-leg assisting force control data being distinct from the right-leg assisting force control data, and wherein the left-leg assisting force control data is configured to be used when the knee ankle foot orthosis is attached to the left leg and the right-leg assisting force control data is configured to be used when the knee ankle foot orthosis is attached to the right leg of the user, calculating a gait motion timing during a gait cycle based on a detection signal that is input from the gait motion state detection sensor at a sampling timing, applying the calculated gait motion timing to either the left-leg assisting force control data or the right-leg assisting force control data to calculate the direction and the size of assisting force to be imparted to the lower-leg frame, and performing operational control for the electric motor such that assisting force having the calculated direction and size can be obtained, wherein the control device is configured to:

recognize as a reference value a detection signal that is input from the rotation sensor when the lower leg is fully extended, and select either the left-leg assisting force control data or the right-leg assisting force control data based on a detection signal that is input from the rotation sensor and that is different from the reference value.

2. A gait motion assisting apparatus applicable to a knee ankle foot orthosis, wherein the knee ankle foot orthosis comprises a thigh attachment to be attached to a user's thigh, a thigh frame extending substantially vertically while supporting the thigh attachment, a lower-leg attachment to be attached to the user's lower leg, and a lower-leg frame extending substantially vertically while supporting the lower-leg attachment, wherein the lower-leg frame is capable of swinging relative to the thigh frame around a brace-side pivot axis that is coaxial with a knee joint of the user, and a swinging position of the lower-leg frame around the brace-side pivot axis when the lower leg is fully extended is defined as a forward swinging end of the lower-leg frame around the brace-side pivot axis relative to the thigh frame, the gait motion assisting apparatus comprises:

a casing having a first orientation that is a connectable orientation wherein an attachment surface faces the knee ankle foot orthosis, and a drive-side pivot axis is positioned coaxially with the brace-side pivot axis, when the knee ankle foot orthosis is attached to the user's left leg, and a second orientation that is a connectable orientation wherein the casing is rotated 180° around the user's trunk axis from the first orientation when the knee ankle foot orthosis is attached to the user's right leg;

an electric motor accommodated in the casing and capable of outputting rotational power in both a first direction toward one side and a second direction toward the other side around an axis from an output shaft;

a drive arm comprising a proximal end part and a distal end part, wherein:

the proximal end part is operatively connected to the output shaft so as to swing in the first direction toward one side and the second direction toward the other side around the drive-side pivot axis in accordance with an output of the output shaft in the first and second directions, respectively, and the drive arm is configured so that when the casing is connected to the knee ankle foot orthosis, the distal end part is directly or indirectly connected to the lower-leg frame so as to press the lower-leg frame around the brace-side pivot axis in accordance with the swing around the drive-side pivot axis;

a rotation sensor capable of detecting a swinging position of the drive arm around the drive-side pivot axis;

a gait motion state detection sensor for detecting a gait motion state during a gait cycle;

a notification means for notifying the user of presence of an error; and a control device having assisting force control data used when:

calculating a direction and a size of assisting force to be imparted to the lower-leg frame wherein the assisting force control data includes left-leg assisting force control data and right-leg assisting force control data, the left-leg assisting force control data being distinct from the right-leg assisting force control data, and wherein the left-leg assisting force control data is configured to be used when the knee ankle foot orthosis is attached to the left leg and the right-leg assisting force control data is configured to be used when the knee ankle foot orthosis is attached to the right leg of the user, calculating a gait motion timing during a gait cycle based on a detection signal that is input from the gait motion state detection sensor at a sampling timing, applying the calculated gait motion timing to a manually selected one of either the left-leg assisting force control data or the right-leg assisting force control data to calculate the direction and the size of assisting force to be imparted to the lower-leg frame, and performing operational control for the electric motor such that assisting force having the calculated direction and size can be obtained, wherein the control device is configured so as to:

recognize as a reference value a detection signal that is input from the rotation sensor when the lower leg is fully extended, determine one of either the left-leg assisting force control data or the right-leg assisting force control data to use based on a detection signal that is input from the rotation sensor and that is different from the reference value, and when the determined one of either the left-leg assisting force control data or the right-leg assisting force control data is different from the manually selected one of either the left-leg assisting force control data or the right-leg assisting force control data selected by manual operation, notify the user of an error via the notification means.

3. The gait motion assisting apparatus according to claim 2, wherein when the determined one of the left-leg assisting force control data or the right-leg assisting force control data is different from the manually selected one of the left-leg assisting force control data or the right-leg assisting force control data, the control device suspends operation of the electric motor in addition to notifying of an error by the notification means.

4. The gait motion assisting apparatus according to claim 2, wherein when the determined one of the left-leg assisting force control data or the right-leg assisting force control data is different from the manually selected one of the left-leg assisting force control data or the right-leg assisting force control data, the control device, in addition to notifying of an error by the notification means, employs the assisting force control data determined to be used based on a signal from the rotation sensor in place of the manually selected one of the left-leg assisting force control data or the right-leg assisting force control data, applies the calculated gait motion timing to the assisting force control data to calculate a direction and a size of assisting force to be imparted to the lower-leg frame, and performs operational control for the electric motor such that assisting force having the calculated direction and size can be obtained.

5. The gait motion assisting apparatus according to claim 1, wherein the control device is configured to select the determined one of the left-leg assisting force control data and the right-leg assisting force control data to be used based on a first detection signal, other than the reference value, input from the rotation sensor after a main power source of the gait motion assisting apparatus is switched ON from OFF.

6. The gait motion assisting apparatus according to claim 1, wherein the rotation sensor is an absolute rotary encoder wherein the reference value is set as a zero-point position.

7. The gait motion assisting apparatus according to claim 1, comprising a manually operable reference switch, wherein the control device recognizes as the reference value a detection signal that is input from the rotation sensor when the reference switch is ON.

8. The gait motion assisting apparatus according to claim 1, wherein the control device calculates angular acceleration of the drive arm around the drive-side pivot axis based on a detection signal that is input from the rotation sensor, recognizes a time when the angular acceleration exceeds a predetermined threshold value as a fully extended position of the lower-leg frame, and recognizes as the reference value a detection signal of the rotation sensor that is input at that time.

9. The gait motion assisting apparatus according to claim 1, comprising a fully extended position detection sensor for directly or indirectly detecting that the lower-leg frame is in a fully extended position, wherein the control device recognizes as the reference value a detection signal that is input from the rotation sensor when the fully extended position detection sensor detects an arrival of the lower-leg frame in the fully extended position.

10. The gait motion assisting apparatus according to claim 1, wherein the gait motion state detection sensor is capable of detecting an angle-related signal relating to a hip joint angle, which is a front-back swinging angle of the user's thigh, and the control device is configured to calculate a thigh phase angle at a sampling timing based on the angle-related signal that is input from the gait motion state detection sensor at a sampling timing, and calculate a gait motion timing during a gait cycle based on the thigh phase angle.

11. The gait motion assisting apparatus of claim 1, wherein the control device is configured to determine which of either a left leg or a right leg the gait motion assisting apparatus is attached to based on the detection signal.

12. The gait motion assisting apparatus of claim 2, wherein the control device is configured to determine which of either a left leg or a right leg the gait motion assisting apparatus is attached to based on the detection signal.

* * * * *